(12) United States Patent
Jackson et al.

(10) Patent No.: US 8,973,150 B2
(45) Date of Patent: *Mar. 3, 2015

(54) METHODS AND APPARATUS TO MITIGATE A DENIAL-OF-SERVICE ATTACK IN A VOICE OVER INTERNET PROTOCOL NETWORK

(71) Applicant: AT&T Intellectual Property I, LP, Atlanta, GA (US)

(72) Inventors: James Jackson, Austin, TX (US); Mehrad Yasrebi, Austin, TX (US)

(73) Assignee: AT&T Intellectual Property I., L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/762,780

(22) Filed: Feb. 8, 2013

(65) Prior Publication Data

US 2013/0152214 A1 Jun. 13, 2013

Related U.S. Application Data

(63) Continuation of application No. 12/124,764, filed on May 21, 2008, now Pat. No. 8,375,453.

(51) Int. Cl.
*G06F 21/00* (2013.01)
*H04L 29/06* (2006.01)

(52) U.S. Cl.
CPC ................... *H04L 63/1458* (2013.01)
USPC ............. 726/26; 709/224; 709/227; 370/252; 370/352; 370/356; 455/408

(58) Field of Classification Search
CPC .................... G06F 21/10; H04L 63/1458
USPC ............................................. 726/26
See application file for complete search history.

(56) References Cited

U.S. PATENT DOCUMENTS

| | | | |
|---|---|---|---|
| 6,640,248 | B1 | 10/2003 | Jorgensen |
| 6,650,619 | B1 | 11/2003 | Schuster et al. |
| 6,654,373 | B1 | 11/2003 | Maher, III et al. |
| 6,741,595 | B2 | 5/2004 | Maher, III et al. |
| 7,058,974 | B1 | 6/2006 | Maher, III et al. |
| 7,088,677 | B1 | 8/2006 | Burst, Jr. |
| 7,099,332 | B2 | 8/2006 | Leung |
| 7,209,473 | B1 | 4/2007 | Mohaban et al. |
| 7,251,218 | B2 | 7/2007 | Jorgensen |

(Continued)

OTHER PUBLICATIONS

A Layered Naming Architecture for the Internet|http://news.cs.nyu.edu/~jinyang/fa07/papers/layername.pdf|Balakrishnan et al.|2004|pp. 1-10.*

(Continued)

*Primary Examiner* — Mahfuzur Rahman
(74) *Attorney, Agent, or Firm* — Hanley, Flight & Zimmerman, LLC

(57) ABSTRACT

Methods and apparatus to mitigate a Denial-of-Service (DoS) attack in a voice over Internet protocol (VoIP) network are disclosed. An example method comprises receiving a communication session initiation message from a communication session endpoint, determining whether the communication session endpoint is associated with a probable DoS attack, and sending to the communication session endpoint a communication session initiation response message comprising a DoS header when the communication session endpoint is associated with the probable DoS attack.

20 Claims, 14 Drawing Sheets

(56) References Cited

U.S. PATENT DOCUMENTS

| | | |
|---|---|---|
| 8,166,521 B2 * | 4/2012 | Zampiello et al. ............... 726/4 |
| 8,194,640 B2 * | 6/2012 | Ramachandran et al. .... 370/352 |
| 2002/0114274 A1 | 8/2002 | Sturges et al. |
| 2003/0031164 A1 | 2/2003 | Nabkel et al. |
| 2004/0193876 A1 | 9/2004 | Donley et al. |
| 2005/0100008 A1 | 5/2005 | Miyata et al. |
| 2005/0111362 A1 | 5/2005 | Freytsis et al. |
| 2005/0207413 A1 | 9/2005 | Lerner |
| 2005/0249214 A1 | 11/2005 | Peng |
| 2005/0265349 A1 | 12/2005 | Garg et al. |
| 2006/0007914 A1 | 1/2006 | Chandra et al. |
| 2006/0268692 A1 | 11/2006 | Wright et al. |
| 2006/0288411 A1 | 12/2006 | Garg et al. |
| 2007/0019625 A1 | 1/2007 | Ramachandran et al. |
| 2007/0061397 A1 | 3/2007 | Gregorat et al. |
| 2007/0076692 A1 | 4/2007 | Croak et al. |
| 2007/0121596 A1 | 5/2007 | Kurapati et al. |
| 2007/0133419 A1 | 6/2007 | Segel |
| 2007/0209067 A1 | 9/2007 | Fogel |
| 2009/0293123 A1 | 11/2009 | Jackson et al. |
| 2010/0226261 A1 | 9/2010 | Piche |
| 2010/0317334 A1 | 12/2010 | Tai et al. |

OTHER PUBLICATIONS

Blacher et al., "An Ontological Approach to SIP DoS Detection," Computer Science C-level thesis, Jan. 22, 2010, 30 pages.

Acme, "Acme Packet Net-Net OS for Session Border Controllers (SBCs)," copyright 2003, 3 pages.

Acme, "Net-Safe—the security requirements framework for SBCs," copyright 2003, 4 pages.

Acme, "Acme Packet Session Border Controller," copyright 2003, 4 pages.

Hilt et al., "Session Initiation Protocol (SIP) Overload Control," draft-hilt-shipping-overload-03, Oct. 26, 2007, 35 pages.

Yasrebi et al., "System for Monitoring Operations of an Enum System," U.S. Appl. No. 11/739,375, filed Apr. 24, 2007, 23 pages.

Yasrebi et al., "Methods and Systems for Protecting a Telecommunication Service," U.S. Appl. No. 11/801,992, filed May 11, 2007, 28 pages.

Jackson et al., "Methods and Apparatus to Control a Flash Crowd Event in a Voice Over Internet Protocol (VOIP) Network," U.S. Appl. No. 12/044,479, filed Mar. 10, 2008, 30 pages.

United States Patent and Trademark Office, "Notice of Allowance," issued in connection with U.S. Appl. No. 12/124,764, mailed Oct. 9, 2012, 22 pages.

United States Patent and Trademark Office, "Non-Final Office Action," issued in connection with U.S. Appl. No. 12/124,764, mailed May 23, 2012, 36 pages.

United States Patent and Trademark Office, "Restriction Requirement," issued in connection with U.S. Appl. No. 12/124,764, mailed Jan. 31, 2012, 10 pages.

* cited by examiner

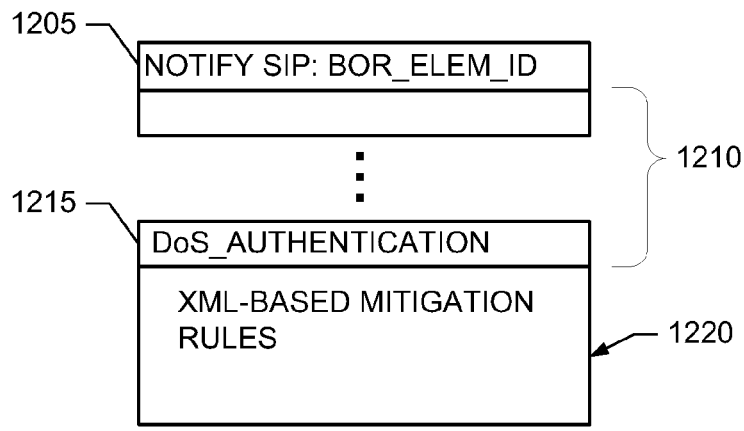

FIG. 12

```
          ⎧  <dos_group>
          ⎪     <filter_spec>
          ⎪        <sip_header>From</sip_header>     ⎫
   1305  ⎨        <regex>314390*</regex>             ⎬ 1310
          ⎪     </filter_spec>
          ⎪     <action>reject 50%</action>
          ⎪     <duration>3600</duration>
          ⎩  </dos_group>
```

1315 — <filter_spec>
1316 — <regex>
1320 — <action>reject 50%</action>
1325 — </dos_group>

FIG. 13A

```
          ⎧  <dos_group>
          ⎪     <filter_spec>
          ⎪        <sip_header>From</sip_header>     ⎫
   1330  ⎨        <regex>314390*</regex>             ⎬ 1310
          ⎪     </filter_spec>
          ⎪     <action>allow 100%</action>
          ⎪     <duration>0</duration>
          ⎩  </dos_group>
```

1335 — <action>allow 100%</action>
1340 — </dos_group>

FIG. 13B

METHODS AND APPARATUS TO MITIGATE A DENIAL-OF-SERVICE ATTACK IN A VOICE OVER INTERNET PROTOCOL NETWORK

CROSS REFERENCE TO RELATED APPLICATION

This patent is a continuation of and claims priority to U.S. application Ser. No. 12/124,764, filed May 21, 2008, entitled "Methods and Apparatus to Mitigate a Denial-of-Service Attack in a Voice Over Internet Protocol Network," which is hereby incorporated herein by reference in its entirety.

FIELD OF THE DISCLOSURE

This disclosure relates generally to voice over Internet protocol (VoIP) networks and, more particularly, to methods and apparatus to mitigate a Denial-of-Service (DoS) attack in a VoIP network.

BACKGROUND

An example attack launched against voice over Internet protocol (VoIP) networks is a so called Denial-of-Service (DoS) attack, which is instigated by, for example, launching large numbers of call setup requests into a VoIP network. For example, in a session initiation protocol (SIP) based network, a large number of SIP INVITE messages may be used to cause high utilization in SIP protocol processors. When processor utilization becomes sufficiently high, initiated communication sessions (both those associated with the attack and benign calls) become effectively blocked.

BRIEF DESCRIPTION OF THE DRAWINGS

FIG. 12 illustrates another example data structures that may be used to implement a SIP protocol message.

FIGS. 13A and 13B illustrate example data structures that may be used to provide DoS attack mitigation information.

DETAILED DESCRIPTION

Figure 1:
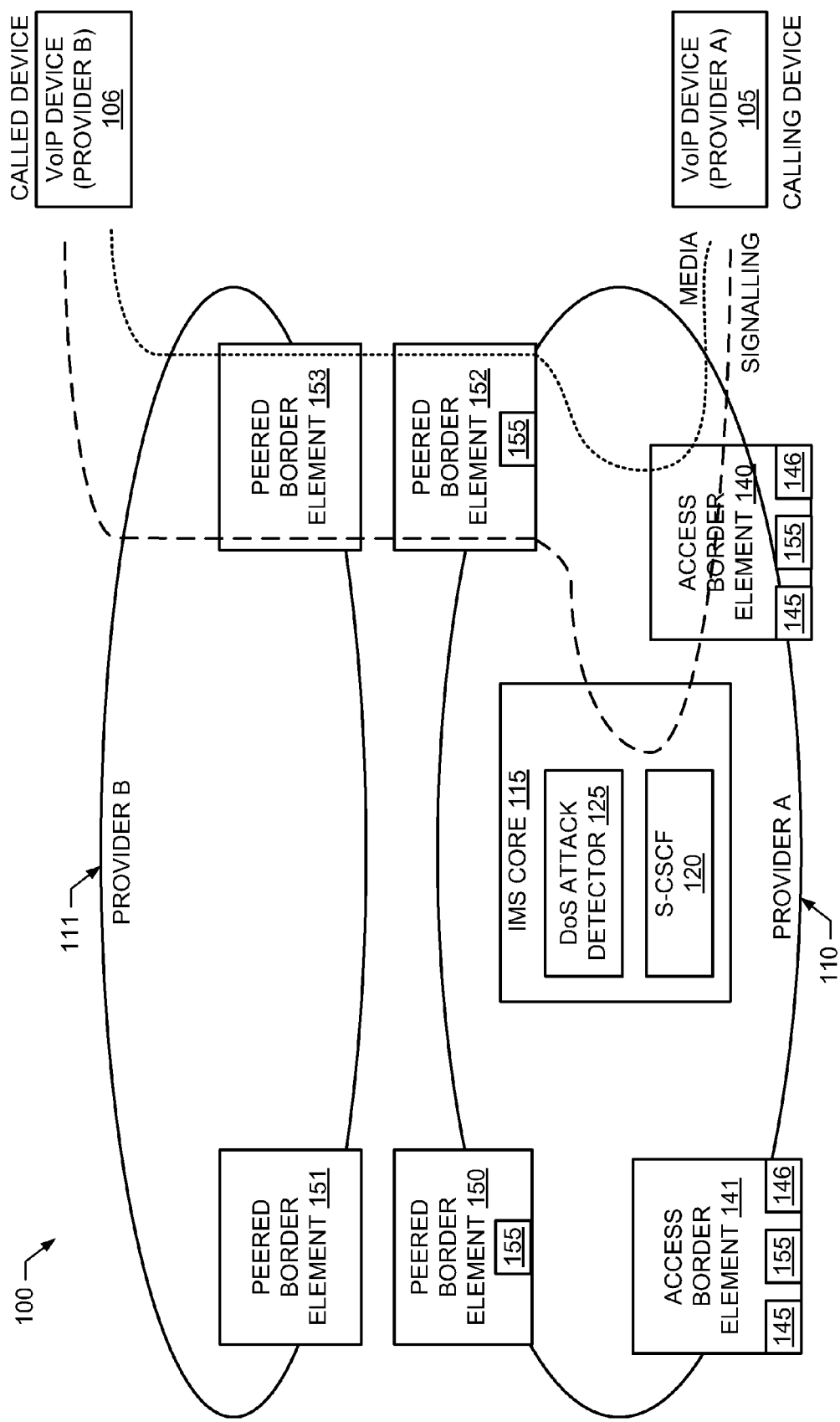
FIG. 1 is a schematic illustration of an example communication systems constructed in accordance with the teachings of the disclosure.

Methods and apparatus to mitigate a Denial-of-Service (DoS) attack in a voice over Internet protocol (VoIP) network are disclosed. A disclosed example method includes receiving a communication session initiation message from a communication session endpoint, determining whether the communication session endpoint is associated with a probable DoS attack, and sending a communication session initiation response message comprising a DoS header when the communication session endpoint is associated with the probable DoS attack.

A disclosed example apparatus includes a network interface to receive a DoS query message from a call session control function (CSCF) server, the DoS query comprising an identifier associated with a communication session endpoint; and a call statistics analyzer to determine a probability that the communication session endpoint is associated with a DoS attack, and to send a DoS attack response message to the CSCF when the probability exceeds a threshold.

Another disclosed example apparatus includes a network interface to receive a communication session initiation message from a communication session endpoint, a DoS checker module to determine whether the communication session endpoint is probably associated with a DoS attack, and a session initiation protocol (SIP) server module to send to the communication session endpoint a communication session initiation response message comprising a DoS header when the communication session endpoint is associated with the DoS attack.

Another disclosed example method includes receiving a communication session initiation response message comprising a DoS header, wherein the communication session initiation response message is directed to a particular communication session endpoint, receiving a communication initiation message from the communication session endpoint, and determining whether to reject the communication initiation message based on the DoS header.

A disclosed example border element for a VoIP network includes a network interface to receive a communication session initiation response message comprising a DoS header, wherein the communication session initiation response message is directed to a particular communication session endpoint, and to receive a communication initiation message from the communication session endpoint; and an attack mitigator to determine whether to reject the communication initiation message based on the DoS header.

Another disclosed example method includes determining call initiation rate statistics, determining a DoS attack mitigation rule based on the call initiation rate statistics, and sending the DoS attack mitigation rule to an attack mitigator via a SIP NOTIFY message.

Another disclosed example apparatus includes a call statistics analyzer to determine a value representative of a likelihood that a DoS attack is occurring, a mitigation rule selector to determine a DoS attack mitigation rule based on the value, and a notifier to send the DoS attack mitigation rule to an attack mitigator via a SIP NOTIFY message.

Yet another disclosed example method includes sending a SIP SUBSCRIBE message to a DoS attack detector, and receiving a DoS attack mitigation rule via a SIP NOTIFY message.

Another disclosed border element for a VoIP network includes a network interface to send a SIP SUBSCRIBE message to a DoS attack detector and to receive a SIP NOTIFY message comprising a DoS attack mitigation rule, and an attack mitigator to determine whether to reject a communication session request message based on the DoS attack mitigation rule.

In the interest of brevity and clarity, throughout the following disclosure references will be made to the example Internet protocol (IP) Multimedia subsystem (IMS) based VoIP network 110 of FIG. 1. Moreover, the following disclosure will be made using example SIP messages, SIP-based message exchanges, and/or DoS mitigation filters or rules expressed as eXtensible Markup Language (XML) based text. However, the methods and apparatus described herein to mitigate a DoS attack are applicable to other IMS and/or VoIP communication systems and/or networks (e.g., networks based on soft switches), VoIP devices, IMS devices, feature servers, tElephone NUMber mapping (ENUM) servers, border elements, access networks, IP networks, IMS networks and/or IMS communication systems, and/or other types of protocols, messages, message exchanges, and/or filter or rule specification languages.

FIG. 1 is a schematic illustration of an example communication system 100 including any number and/or type(s) of VoIP user devices, two of which are designated at reference numerals 105 and 106. Example VoIP user devices 105 and 106 include, but are not limited to, IMS (e.g., VoIP) phones, VoIP residential gateways, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), and/or VoIP kiosks. The example VoIP devices 105 and 106 of FIG. 1 may be implemented and/or be found at any number and/or type(s) of locations. Further, the VoIP devices 105 and 106 may be fixed location devices, substantially fixed location devices and/or mobile devices. Moreover, the VoIP devices 105 and 106 may have equipment communicatively and/or electrically coupled to them. For example, a VoIP ATA may be coupled to a telephone, and/or a VoIP residential gateway may be coupled to a PC and/or set-top box. Further still, the VoIP devices 105 and 106 may be associated with the same and/or different service provider networks. For example as shown in FIG. 1, the VoIP device 105 is associated with a first service provider network 110, and the VoIP device 106 is associated with a second service provider network 111.

To provide communication services to a first set of subscribers (e.g., associated with a first service provider A), the example communication system 100 of FIG. 1 includes an IMS network 110 made available by the first provider A. Likewise, to provide communication services to a second set of subscribers (e.g., associated with the second service provider B), the example communication system 100 of FIG. 1 includes any type of IMS and/or VoIP network 111 made available by the second provider B. However, the IMS network 110 need not be communicatively coupled to another IMS network (whether operated by the provider A and/or any other provider). In general, the example IMS network 110 of FIG. 1 provides and/or enables IMS and other communication services (e.g., telephone services, Internet services, data services, messaging services, instant messaging services, electronic mail (email) services, chat services, video services, audio services, gaming services, voicemail, facsimile services, etc.) to the example VoIP device 105, to VoIP devices of other service providers (e.g., the example VoIP device 106), and/or to other devices of the network 110 or any other service provider (e.g., service provider B).

To implement the communication services, the example IMS network 110 of FIG. 1 includes an IMS core 115. In the illustrated example IMS network 110 of FIG. 1, each VoIP device (e.g., the example VoIP device 105) that is registered to the example IMS network 110 is associated with and/or assigned to a serving call session control function (S-CSCF) server (one of which is designated in FIG. 1 with reference numeral 120). The example S-CSCF server 120 of FIG. 1 is responsible for handling incoming and/or outgoing IMS (e.g., VoIP) communication sessions (e.g., telephone calls, and/or data and/or video sessions) associated with its registered VoIP devices (e.g., the VoIP device 105). While the example methods and apparatus to mitigate a DoS attack are described with reference to a S-CSCF server (e.g., the example S-CSCF server 120), the methods and apparatus may, additionally or alternatively, be implemented by an interrogating CSCF server and/or a proxy CSCF server.

While one S-CSCF server 120 is illustrated in FIG. 1, the IMS core 115 and/or, more generally, the example IMS network 110 may include any number and/or type(s) of S-CSCF servers, and each such S-CSCF server may support any number and/or type(s) of VoIP devices. The example S-CSCF server 120 of FIG. 1 performs session control, maintains session states and/or enables communications with call feature servers (not shown) for its associated and/or registered VoIP devices. For instance, when the VoIP device 105 initiates, for example, an outgoing telephone call to the example VoIP device 106, a communication session initiation message (e.g., a SIP INVITE message) sent by the VoIP device 105 is routed by the IMS network 110 to the S-CSCF server 120 associated with the VoIP device 105. An example manner of implementing the example S-CSCF server 120 is described below in connection with FIG. 4. An example manner of implementing an IMS network 110 and/or an IMS core 115 is described in U.S. patent application Ser. No. 11/745,813, filed on May 8, 2007, entitled "Methods and Apparatus to Route a Communication Session in an IMS Network," and which is incorporated herein by reference in its entirety.

The example methods and apparatus to mitigate DoS attacks in VoIP networks described herein provide a number of advantages such as (a) detecting and mitigating DoS attacks, wherein each of a set of attacking calling IMS endpoints submit communication session requests at a low enough rate to avoid individual detection (e.g., a distributed DoS attack), (b) allowing DoS attack mitigation to be performed on selected IMS endpoints, (c) allowing DoS attack mitigation to be performed on selected IMS endpoints even when their associated SIP messages pass through one or more border elements or S-CSCF servers, and (d) recognizing and/or blocking particular communication request messages (e.g., containing an unsupported header type or malicious header field) that caused a network fault in the past.

In general, a DoS attack detector 125 of the example IMS core 115 of FIG. 1 monitors and/or analyzes the present and/or historical call initiation behavior of individual IMS endpoints 105, 106, the collective behavior of multiple IMS endpoints 105, 106, and/or the call initiation behavior flowing through one or more border elements 140, 141, 150-153 to detect DoS attacks. When a DoS attack is detected, the DoS attack detector 125 notifies one or more corresponding border elements 140, 141, 150, 152, which mitigate the DoS attack by blocking some or all of the subsequent communication session requests associated with the offending IMS endpoint(s) 105, 106 and/or border element(s) 140, 141, 150-153. As described in connection with the examples disclosed herein, DoS attack mitigation information may be provided by the DoS attack detector 125 to one or more of the border elements 140, 141, 150 and/or 152 via an in-band signaling protocol and/or an out-of-band signaling protocol. For example, as described below in connection with FIGS. 2-10, a border element 140, 141, 150, 152 can be notified of a DoS attack and be provided with DoS attack mitigation information via a DoS header 315 (FIG. 3) that is added to a communication session initiation response message, such as a SIP 200 OK message or a SIP 5XX response message, where XX stands for any applicable numeric pair of digits. Because the DoS header 315 is added to a SIP 200 OK message or a SIP 5XX response message sent in response to a received SIP INVITE message, the DoS attack mitigation information is considered in-band with regards to the signaling protocol stream being used to setup the requested communication session. In the examples described herein, the in-band signaling information (e.g., the DoS header 315) is removed before the SIP 5XX or SIP 200 OK message is provided to the IMS endpoint 105. Additionally or alternatively, as described more fully below in connection with FIGS. 11A-C, 12, 13A-B and 14-16, a border element 140, 141, 150, 152 can subscribe to DoS attack mitigation information by sending a SIP SUBSCRIBE message to the DoS attack detector 125 and receiving DoS attack mitigation information from the DoS attack detector 125 via SIP NOTIFY messages (FIGS. 12 and 13A-B). Because the SIP SUBSCRIBE and SIP NOTIFY messages are not associated with any signaling protocol stream being used to setup any particular requested communication session, they are considered herein as an out-of-band signaling protocol. In some examples, the DoS attack detector 125 and the border elements 140, 141, 150 and 152 use a combination of in-band and out-of-band signaling protocols to provide DoS attack indicators and/or DoS attack mitigation information.

To detect DoS attacks, the example IMS core 115 of FIG. 1 includes the example DoS attack detector 125. Using communication session request information (e.g., call setup parameters contained in a SIP INVITE message) received from the example S-CSCF server 120, the example DoS attack detector 125 of FIG. 1 determines whether and/or how likely it is that communication session requests from one or more IMS endpoints 105 and 106 are associated with a DoS attack. The DoS attack detector 125 can, for example, use call initiation rates (e.g., the number of SIP INVITE messages received over a time interval) and/or a current call processing load of the IMS core 115 to determine whether and/or how likely it is that there is an ongoing and/or active DoS attack.

For example, if a particular calling IMS device's call initiation rate exceeds a rate_threshold (e.g., X calls per second), the example DoS attack detector 125 determines that the calling IMS device is part of a DoS attack. The DoS attack detector 125 may use one or more additional rate thresholds to determine a likelihood that the calling IMS device is participating in a DoS attack. Additionally or alternatively, if the calling IMS device's call initiation rate does not exceed the rate_threshold but the current call processing load of the IMS core 115 exceeds a load_threshold, the example DoS attack detector 125 checks whether two or more calling IMS devices have call initiation rates that together could represent a call initiation pattern indicative of a potential DoS attack. For example, there may be ten IMS devices each sending SIP INVITE messages at a rate that is less than the rate_threshold, but having a collective call initiation rate exceeding the average call initiation rate supportable by the IMS core 115 and, thus, leading to a potentially loaded condition for the IMS core 115. Such a pattern of activity could be indicative of a distributed DoS attack. An example manner of implementing the example DoS attack detector 125 of FIG. 1 is described below in connection with FIG. 5.

While some example methods and apparatus described herein utilize call initiation rates and/or a current IMS core load to detect a DoS attack, any number and/or type(s) of additional and/or alternative parameters, measurements and/or algorithms may be used to detect DoS attacks. For example, DoS attacks may, additionally or alternatively, be detected by tracking one or more parameters indicative of historical activity by an IMS endpoint and detecting when current activity differs from historical activity. For instance, an IMS endpoint that has historically initiated twelve communication sessions per day, but is now initiating sixty per minute may well be involved in an attack. Moreover, the example DoS attack detector 125 of FIG. 1 can detect particular communication session requests and/or communication session request types that have caused one or more IMS network 110 and/or IMS core 115 faults and/or errors in the past. When such requests and/or request types are detected, the example DoS attack detector 125 could provide one or more mitigation rules to the border elements 140, 141, 150, 152 such that particular requests and/or request types can be blocked at the edges of the IMS network 110 and, thus, limit the deleterious effects of such events on the IMS core 115. For example, a SIP message (e.g., a SIP INVITE message) directed to a restricted or particular called device, originating from a particular geographic area, originating from or via one or more particular IP addresses or Internet domains, or having one or more unknown, undefined and/or flawed header fields that have caused errors or faults in the IMS core 115 can be detected, and mitigation rules generated to cause the example border elements 140, 141, 150, 152 to block all subsequent SIP messages having one or more of the offending header fields. Such mitigation rules may, in some instances, have nothing to do with an associated call initiation rate, but only on the content(s) of the SIP message.

To provide entry and/or exit points to the example IMS network 110, the example IMS network 110 of FIG. 1 includes any number of access border elements, two of which are designated at reference numerals 140 and 141. The example access border elements 140 and 141 of FIG. 1 implement boundary points between (a) one or more private networks used to implement the example IMS network 110, and (b) one or more public networks (e.g., the Internet), one or more private networks (e.g., home and/or corporate local area networks) and/or one or more access networks by which the example VoIP device 105 is or may be communicatively coupled to one or both of the example border elements 140 and 141. Each of the example access border elements 140, 141 includes a first interface 145 to one or more private networks used to implement the example IMS network 110, and a second interface 146 to one or more public networks (e.g., the Internet), one or more private networks (e.g., home and/or corporate local area networks) and/or one or more access networks by which the example VoIP device 105 may be communicatively coupled to the access border element 140, 141. The example first interfaces 145 and the example second interfaces 146 of FIG. 1 operate in accordance with any of the Institute of Electrical and Electronics Engineers (IEEE) 802.3x (a.k.a. Ethernet) family of standards. In some instances, the example access border elements 140 and 141 may implement and/or carry out call admission control, denial of service control, SIP header manipulation and/or media anchoring. In the example IMS network 110, the access border elements 140 and 141 are located to provide different entry and/or exit points for the IMS network 110. For example, the access border element 140 is an access point for a first geographic region, while the access border element 141 is an access point for a second geographic region. In other examples, access border elements 140 and 141 are implemented and/or located based on loading constraints and/or network fault recover constraints.

The example service provider networks 110 and 111 of FIG. 1 are communicatively coupled via any number of pairs of peered border elements. A first pair of peered border elements is designated in FIG. 1 with reference numerals 150 and 151, and a second pair of peered border elements is designated with reference numerals 152 and 153. Peered border elements 150-153 are corresponding border elements of two different service provider networks (e.g., the example networks 110 and 111) that are implemented by the service providers to facilitate communication sessions between subscribers of the two service providers. Peered border elements 150-153 implement, for example, handshaking, media translation(s) and/or protocol message modification(s) to facilitate communications across the two service provider networks.

Typically, the pairs of peered border elements 150, 151 and 152, 153 are located so as to provide communicatively coupling between the service provider networks 110 and 111 at geographically separated locations. The locations at which peered border elements 150, 152 are located may differ depending on the identity and/or location(s) of the service provider(s) with which the IMS network 110 has a peering relation. In some examples, the peered border elements 150-153 are located at IP peering locations to facilitate deterministic IP quality-of-service. However, not all IP peering locations need support VoIP peering. In general, a platform, computer and/or workstation used to implement an access border element 140, 141 may be configured to, additionally or alternatively, implement a peered border element 150-153. The peered border elements 150-153 may be communicatively coupled via any number and/or type(s) of communication paths and/or links.

To perform DoS attack mitigation, each of the example border elements 140, 141, 150 and 152 of FIG. 1 includes a DoS attack mitigator 155. The example attack mitigators 155 of FIG. 1 perform DoS attack mitigation based on DoS attack mitigation information, rules or filters received via in-band signaling (e.g., a DoS header of a SIP 5XX response message) and/or out-of-band signaling (e.g., a SIP NOTIFY message not included in a call setup process). When DoS attack mitigation information is received at a border element 140 141, 150 and 152, the associated attack mitigator 155 validates the DoS attack mitigation information. If the DoS attack mitigation information is valid, the attack mitigator 155 updates its database 515 (FIG. 5) of DoS attack mitigation rules and/or filters. When a call initiation request (e.g., a SIP INVITE message) is received from a calling IMS device 105, 106, the attack mitigator 155 queries its database of DoS attack mitigation rules and/or filters to determine whether the requested communication session is to be rejected. For example, an attack mitigator 155 may discard SIP INVITE messages received from a specific IMS device 105, 106 to enforce a maximum rate at which the calling IMS device 105, 106 is allowed to request communication sessions. Additionally or alternatively, an attack mitigator 155 may temporarily (e.g., for five minutes) block all communication session requests associated with a set of IMS endpoints 105 and 106, and/or reject a communication session request because the request contains one or more offending headers. For rejected requests, the border element 140, 141, 150, 152 responds to the calling IMS device 105, 106 with a SIP 5XX response message. For accepted requests, the border element 140, 141, 150, 152 responds to the request with a SIP 100 TRYING message and forwards the communication session request message to the IMS core 115. If an attack mitigator 155 is associated with an access border element 140, 141, the attack mitigator 155 may perform call initiation rate limiting or blocking based on the IP address assigned to the offending IMS device. An example manner of implementing any or all of the example attack mitigators 155 of FIG. 1 is described below in connection with FIG. 6. An example data structure that may be used to implement a DoS database 515 is described below in connection with FIG. 7.

In some examples, the border elements 140, 141, 150, 152 modify received communication session request messages to include a border element identifier prior to forwarding the request message to the IMS core 115. Such border element identifiers may be used by the example DoS attack detector 125 to determine DoS attack patterns associated with particular border elements 140, 141, 150, 152, for example, to detect a DoS attack originating via one of the peered border elements 151, 153 of provider B's IMS network 111.

The example DoS attack detector 125 of FIG. 1 monitors the call initiation statistics of calling IMS endpoints 105 and 106 to detect the start and/or end of a DoS attack. To terminate DoS attack mitigation for a particular calling IMS endpoint 105, 106, the DoS attack detector 125 can, for example, add a DoS header that disables blocking for the calling IMS endpoint 105, 106 to a SIP response message (e.g., a SIP 200 OK message) sent to the calling IMS endpoint. To terminate DoS attack mitigation for a particular set of calling IMS endpoints 105 and 106, the DoS attack detector 125 can, for example, send a SIP NOTIFY message to the border elements 140, 141, 150 and/or 152 that disables blocking for the IMS endpoints 105 and 106. Additionally or alternatively, the example attack mitigators 155 of FIG. 1 can monitor the number of blocked and/or rejected communication session initiation requests. For example, when the number of blocked and/or rejected requests is zero and/or less than threshold for a specified period of time (e.g., 60 seconds), the attack mitigators 155 can automatically disable blocking for the calling IMS endpoint 105, 106 and notify the DoS attack detector 125 (e.g., using a SIP NOTIFY message) that the calling IMS endpoint 105, 106 no longer appears to be associated with a DoS attack. In another example, the attack mitigator 155 notifies the DoS attack detector 125 when the calling IMS endpoint 105, 106 no longer appears to be associated with a DoS attack, and waits for confirmation from the DoS attack detector 125 before disabling blocking for the calling IMS endpoint 105, 106.

In some examples, the network 111 is implemented similarly to the example IMS network 110 and, additionally or alternatively, implements the methods and/or apparatus to mitigate a DoS attack described above. However, the network 111 may be implemented using any number and/or type(s) of server(s), device(s) and/or architecture(s). Moreover, the example IMS network 110 of FIG. 1 mitigates DoS attacks as described herein, regardless of whether the network 111 implements any DoS attack mitigation method.

While an example IMS network 110 has been illustrated in FIG. 1, the devices, networks, systems, servers and/or processors illustrated in FIG. 1 may be combined, divided, re-arranged, eliminated and/or implemented in any way. For example, the example S-CSCF server 120, the example DoS attack detector 125, the example access border elements 140, 141, the example interfaces 145, 146, the example peered border elements 150, 152, the example attack mitigators 155 illustrated in FIG. 1 may be implemented separately and/or in any combination using, for example, machine accessible instructions executed by one or more computing devices and/or computing platforms (e.g., the example processing platform 9000 of FIG. 17). Further, the example IMS core 115, the example S-CSCF server 120, the example DoS attack detector 125, the example access border elements 140, 141, the example interfaces 145, 146, the example peered border elements 150, 152, the example attack mitigators 155 and/or, more generally, the example IMS network 110 may be implemented by hardware, software, firmware and/or any combination of hardware, software and/or firmware. Thus, for example, any or all of the example IMS core 115, the example S-CSCF server 120, the example DoS attack detector 125, the example access border elements 140, 141, the example interfaces 145, 146, the example peered border elements 150, 152, the example attack mitigators 155 and/or, more generally, the example IMS network 110 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example IMS core 115, the example S-CSCF server 120, the example DoS attack detector 125, the example access border elements 140, 141, the example interfaces 145, 146, the example peered border elements 150, 152, the example attack mitigators 155 and/or, more generally, the example IMS network 110 are hereby expressly defined to include a tangible medium such as a memory, a digital versatile disc (DVD), a compact disc (CD), etc. Further still, the example IMS networks 110, 111 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors. For example, the IMS core 115 may include one or more of an ENUM server, a DNS server, a feature server, a proxy CSCF server, an interrogating CSCF server, a feature server, an application server, a home subscriber server (MHSS), a media gateway, a breakout gateway control function (BGCF) sever, a media gateway control function (MGCF) server, a softswitch, an IP router, an IP switch, etc.

Figure 2:
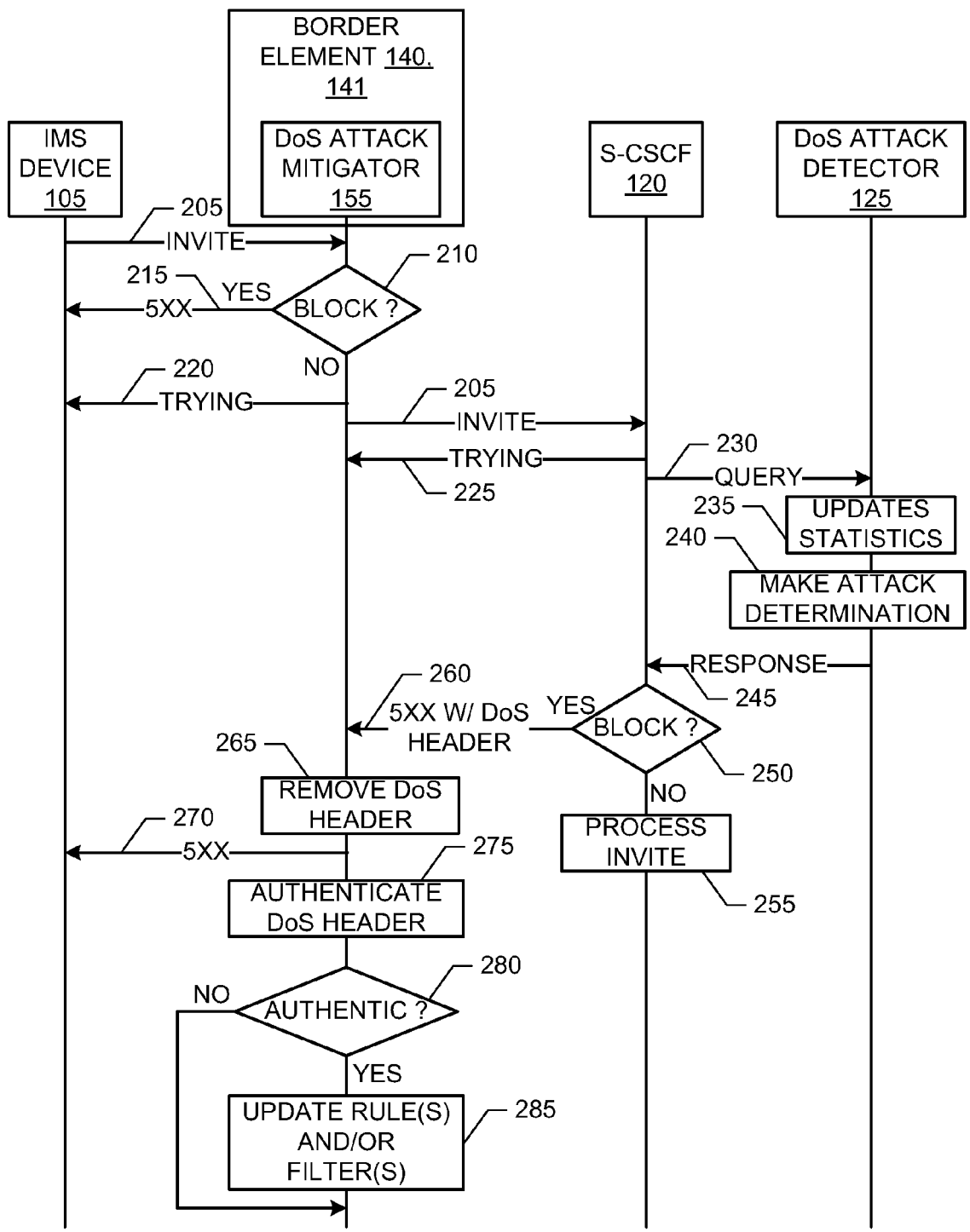
FIG. 2 illustrates example in-band message protocol exchanges that may carried out by the example IMS network of FIG. 1 to detect and mitigate a denial-of-service (DoS) attack.

FIG. 2 illustrates example in-band message protocol exchanges that are carried out by the example IMS network 110 of FIG. 1 to detect and mitigate a DoS attack. The example protocol exchanges of FIG. 2 begin with the example IMS device 105 sending a SIP INVITE message 205 to a border element 140, 141 having a DoS attack mitigator 155. The example DoS attack mitigator 155 of FIG. 2 determines, based on currently active DoS attack mitigation rules and/or filters, whether the requested communication session request is to be blocked (block 210). For example, the DoS attack mitigator 155 can compare a current call initiation rate associated with the IMS device 105 with a threshold, and/or compare an identifier associated with the IMS device 105 to a list of identifiers specified in a DoS attack mitigation rule. If the requested communication session is to be blocked (block 210), the DoS attack mitigator 155 sends a SIP 5XX response message 215 to the IMS device 105.

If the requested communication session is not to be blocked (block 210), the border element 140, 141 responds to the IMS device 105 with a SIP 100 TRYING message 220 and forwards the SIP INVITE message 205 to the example S-CSCF 120. The S-CSCF server 120 responds to the SIP INVITE message 205 by sending a SIP 100 TRYING message 225 and sending a query 230 to the example DoS attack detector 125 to determine if the requested communication session should be admitted to the IMS network 110.

The example DoS attack detector 125 of FIG. 2 updates call initiation statistics for the calling IMS device 105 (block 235) and determines whether the calling IMS device 105 is associated with a likely DoS attack (block 240). The example DoS attack detector 125 can, for example, use call initiation rates (e.g., the number of SIP INVITE messages received over a time interval) and/or a current call processing load of the IMS core 115 to determine whether and/or how likely it is that there is an ongoing and/or active DoS attack. Additionally or alternatively, if the current call processing load of the IMS core 115 exceeds a load_threshold, the DoS attack detector 125 can check whether two or more calling IMS devices 105 and 106 have call initiation rates that together could represent a call initiation pattern indicative of a potential DoS attack. Further still, a DoS attack may be detected by comparing historical activity associated with the IMS endpoint 105 to its current activity. Moreover, the example DoS attack detector 125 of FIG. 1 can detect whether the SIP INVITE message 205 contains any headers or parameters that have caused one or more IMS network 110 and/or IMS core 115 faults and/or errors in the past.

The example DoS attack detector 125 of FIG. 2 responds to the query 230 with an indication or response 245 representing whether the IMS device 105 appears to be participating in a DoS attack. When the response 245 indicates that the calling IMS device 105 does not appear to be participating in a DoS attack (block 250), the S-CSCF server 120 continues processing the SIP INVITE message 205 in accordance with any past, present of future SIP protocol standard and/or specification (block 255). In some examples, if the DoS detector 125 determines that the calling IMS endpoint is no longer associated with a DoS attack, or the risk of being still associated with a DoS is acceptably low, the DoS detector 125 responds with an indication 245 that the S-CSCF 120 should admit the requested communication session, and should add to a subsequent SIP message (e.g., a SIP 200 OK message) sent to the IMS device 105 a DoS header and a DoS authentication header. The DoS header of the subsequent SIP 200 OK message could, for example, direct the DoS attack mitigator 155 to admit a higher percentage of or all SIP INVITE messages associated with the IMS device 105.

When the response 245 indicates that the calling IMS device 105 appears to be participating in a DoS attack (block 250), the S-CSCF server 120 sends a SIP 5XX message 260 that includes a DoS header and a DoS authentication header. An example data structure that may be used to implement a SIP 5XX response message containing a DoS header and a DoS authentication header is described below in connection with FIG. 3. In the illustrated example of FIG. 2 there is no intervening border element 140, 141, 150, 152 located between the DoS attack mitigator 155 and the IMS device 105, the DoS attack mitigator 155 removes the DoS header and the DoS authentication header (block 265) and sends the modified SIP 5XX message 270 to the IMS device 105. The DoS attack mitigator 155 authenticates the DoS header (block 275). If the DoS header is authentic (block 280), the DoS attack mitigator 155 updates its local database 610 (FIG. 6) of DoS attack mitigation rules and/or filters (block 285).

When there is a border element 140, 141, 150, 152 located between the DoS attack mitigator 155 and the IMS device 105 of FIG. 2, the DoS attack mitigator 155 authenticates the DoS header and, if authentic, updates its local database 610 of DoS attack mitigation rules and/or filters, and then forwards the SIP 5XX response message to the intervening border element 140, 141, 150, 152 without removing the DoS header and the DoS authentication header. All subsequent DoS attack mitigators 155 receiving the SIP 5XX message 260 apply the updated DoS attack mitigation rules and/or filters to subsequent SIP INVITE messages.

As described above, DoS headers and the DoS authentication headers are preferably removed from SIP messages (e.g., a SIP 5XX response message and/or a SIP 200 OK message) by an access border element (e.g., the access border element 140) before such SIP messages are sent from the access border element to a calling IMS device 105, 106. As such, the DoS headers and DoS authentication headers of the illustrated example are used internally by the IMS network 110 to indicate whether a particular IMS endpoint 105, 106 is participating in a DoS attack and/or to defines how the border elements (access, peered and/or otherwise) 140, 141, 150 and/or 152 are to limit communication session request messages for the IMS endpoint 105, 106. The DoS headers and/or DoS authentication headers may also be removed by the example peered border element 150, 152 when the associated peered IMS network 111 does not support the DoS mitigation methods and apparatus described herein.

If the above methods and apparatus are insufficient to reduce the current processing load of the IMS core 115, the example DoS attack detector 125 may employ any number and/or type(s) of additional and/or alternative overload reduction algorithms to reduce the load on the IMS core 115. For example, the DoS attack detector 125 may reduce the allowed aggregate data rate for the communication path(s) between each of the border elements 140, 141, 150 and 152 and the IMS core 115. While such data rate reductions could potentially affect both valid, offending and/or potentially offending communication sessions, they serve to ensure the IMS core 115 does not be become overloaded and/or become unstable.

Figure 3:
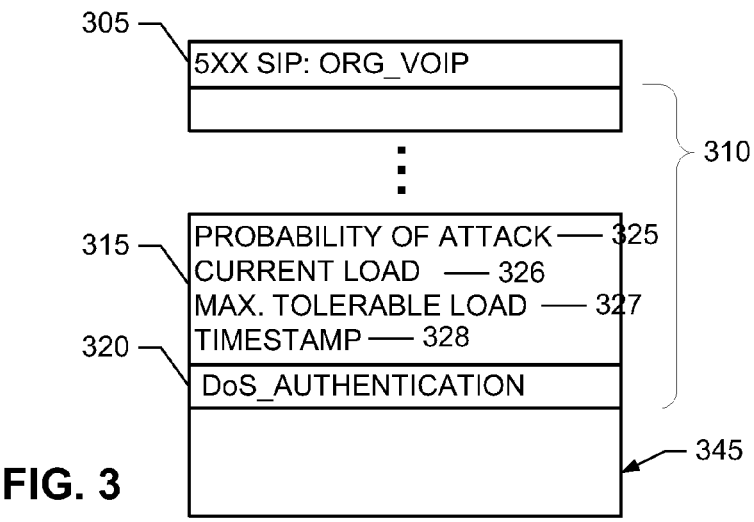
FIG. 3 illustrates an example data structure that may be used to implement a session initiation protocol (SIP) protocol message.

FIG. 3 illustrates an example data structure that may be used to implement a SIP message, such as a SIP communication session response message (e.g., a SIP 5XX message or a SIP 200 OK message). To identify the SIP message, the example data structure of FIG. 3 includes a name field 305. The example name field 305 of FIG. 3 includes an alphanumeric string that identifies the SIP message and identifies a destination for the example message. The example SIP message illustrated in FIG. 3 is a SIP 5XX message and, thus, the example name field 305 contains a string that includes "5XX". Such a SIP message may be sent, for example, to respond to a communication session request message received from a called device. In the illustrated example, the SIP message is addressed to "org_voip." The name field 305 could be used to identify any type of SIP message to any applicable destination(s).

To provide additional values and/or parameters, the example data structure of FIG. 3 includes one or more header fields 310. Example header fields 310 include, but are not limited to, a from field, a caller identification field, a command sequence number field, a border element identifier, a DoS header 315 and/or a DoS authentication header 320. The number of header fields 310, in some examples, depends upon the type of SIP message and/or the protocol(s) implemented by either endpoint.

The example DoS header 315 of FIG. 3 contains an attack probability value 325 that represents the probability that the calling IMS endpoint specified in the name field 305 (e.g., org_voip) is associated with a DoS attack. The example DoS header 315 also contains an initiation rate value 326 that represents the current call initiation rate associated with the calling IMS endpoint, and a maximum initiation rate value 327 that represents the maximum allowable call initiation rate (e.g., X calls per second) at which the IMS endpoint is allowed to initiate communication sessions. If there is not a limit on how often the IMS endpoint may initiate communication sessions, the value 335 is set to a negative value (e.g., negative one). The DoS header 315 also contains a timestamp 328 that represents the time at which the example SIP message of FIG. 3 was sent.

To allow the example DoS header 315 of FIG. 3 to be authenticated, the example data structure of FIG. 3 includes the DoS authentication header 320. The example DoS authentication header 320 of FIG. 3 allows a receiver of the example SIP message of FIG. 3 to validate the authenticity of the DoS header to thereby avoid abuse and/or to prevent techniques aimed at disabling DoS mitigation for the example IMS network 110 of FIG. 1.

The example DoS authentication header 320 of FIG. 3 contains a hash value that represents a cryptographic hash of the call dialog identifiers (e.g., the values of the from, to, and call-id fields of the example data structure of FIG. 3) and the values 325-328 of the example DoS header 315. In some instances, the cryptographic hash may be digitally signed using a shared and/or private key. The example data structure of FIG. 3 may also contain a payload 345 having any number and/or type(s) of additional parameters, data and/or information.

While an example data structure that may be used to implement a SIP protocol message is illustrated in FIG. 3, a SIP protocol message may be implemented using any number and/or type(s) of other and/or additional fields and/or data. For example, a DoS header 315 and/or the payload 345 could, additionally or alternatively, contain a DoS attack mitigation filter specification (e.g., specified using XML-based text blocks as described below in connection with FIGS. 12, 13A and 13B). Such filter specifications could specify, for example, to reduce all calls from a given IMS endpoint (e.g., a particular telephone number or IP address) by 25%, to block all calls containing a specific header, and/or to prioritize calls directed to a specific endpoint (e.g., a specific telephone number or IP address). Further, the fields and/or data illustrated in FIG. 3 may be combined, divided, re-arranged, eliminated and/or implemented in any way. Moreover, a SIP protocol message may include fields and/or data in addition to, or instead of, those illustrated in FIG. 3, and/or may include more than one of any or all of the illustrated fields and/or data.

Figure 4:
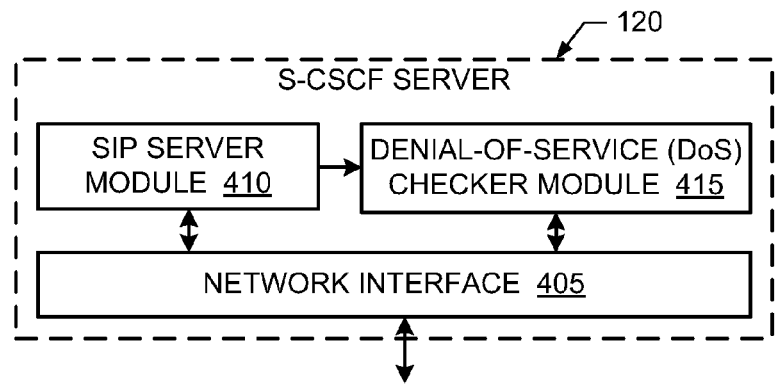
FIG. 4 illustrates an example manner of implementing the example serving call session control function (S-CSCF) server of FIG. 1.

FIG. 4 illustrates an example manner of implementing the example S-CSCF server 120 of FIG. 1. To communicate with other devices in an IMS network (e.g., with any or all of the example DoS attack detector 125 and/or the example border elements 140, 141, 150 and/or 152), the example S-CSCF server 120 of FIG. 4 includes any type of network interface 405. The example interface 405 of FIG. 4 operates in accordance with any of the IEEE 802.3x (a.k.a. Ethernet) family of standards.

To process SIP messages and/or protocols, the example S-CSCF server 120 of FIG. 4 includes any number and/or type(s) of SIP server modules, one of which is illustrated in FIG. 4 with reference numeral 410. The example SIP server module 410 of FIG. 4 handles and/or processes incoming and/or outgoing SIP messages. The example SIP server module 410 of FIG. 4 implements a state engine and/or maintains state information for SIP transactions, dialogs, and communication sessions including, for example, handling registrations and incoming/outgoing calls as defined in Internet Engineering Task Force (IETF) Request for Comment (RFC) 3261.

To query the example DoS attack detector 125 of FIG. 1 and/or to provide communication session request information to the DoS attack detector 125, the example S-CSCF server 120 of FIG. 4 includes a DoS checker module 415. When a communication session initiation request message (e.g., a SIP INVITE message) is received via the example network interface 405, the example DoS checker module 415 of FIG. 4 sends the request message and/or communication session request information received in the request message (e.g., called party identifier, calling party identifier, etc.) to the DoS attack detector 125. If in-band protocol signaling is being used to provide DoS attack indications and/or DoS attack mitigation information, the example DoS module 415 waits for a response from the DoS attack detector 125. Based on the response received from the DoS attack detector 125, the example DoS checker module 415 directs the example SIP server module 410 to: (a) respond to the calling IMS endpoint with a SIP 5XX message containing a DoS header and a DoS authentication header, (b) admit the requested communication session, or (c) admit the requested communication session, and add a DoS header and a DoS authentication header to a subsequent SIP response message (e.g., a SIP 200 OK message). If out-of-band protocol signaling is being used to provide DoS attack indications and/or DoS attack mitigation information, the SIP server module 410 processes the SIP INVITE message in accordance with any past, present and/or future SIP protocol standard and/or specification.

While an example manner of implementing the example S-CSCF server 120 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. Further, the example network interface 405, the example SIP server module 410, the example DoS checker module 415 and/or, more generally, the example S-CSCF server 120 of FIG. 4 may be implemented by hardware, software, firmware and/or any combination of hardware, software and/or firmware. Thus, for example, any or all of the example network interface 405, the example SIP server module 410, the example DoS checker module 415 and/or, more generally, the example S-CSCF server 120 may be implemented by one or more circuit(s), programmable processor(s), ASIC(s), PLD(s) and/or FPLD(s), etc. When any of the appended claims are read to cover a purely software implementation, at least one of the example network interface 405, the example SIP server module 410, the example DoS checker module 415 and/or, more generally, the example S-CSCF server 120 are hereby expressly defined to include a tangible medium such as a memory, a DVD, a CD, etc. Further still, a border element may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
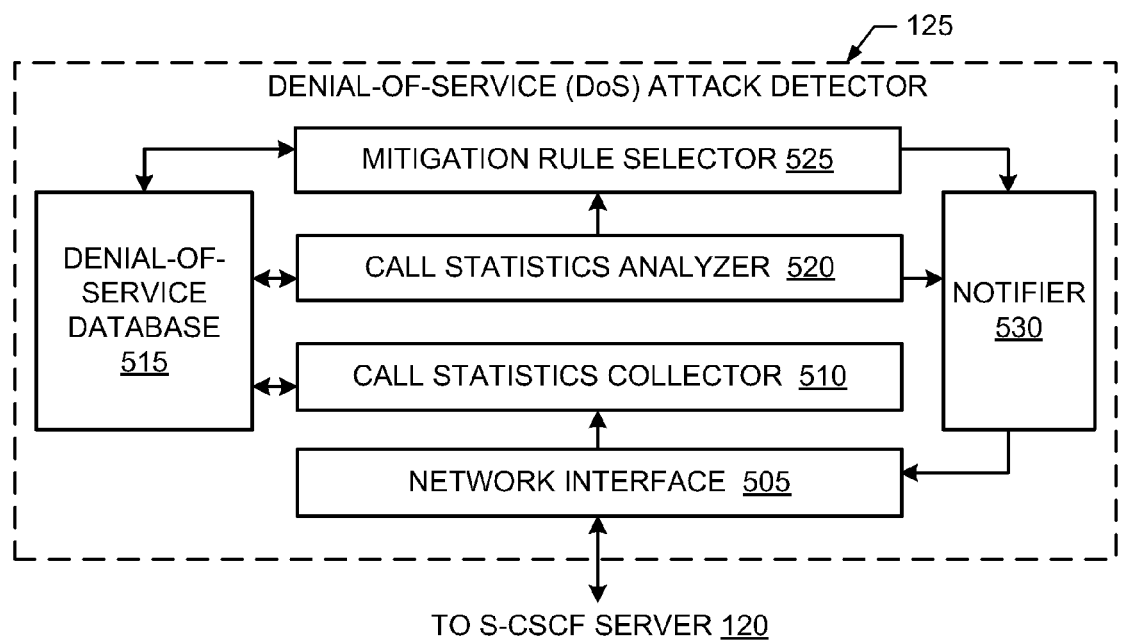
FIG. 5 illustrates an example manner of implementing the example DoS attack detector of FIG. 1.

FIG. 5 illustrates an example manner of implementing the example DoS attack detector 125 of FIG. 1. To communicate with other devices an IMS core (e.g., the example S-CSCF server 120), the example DoS attack detector 125 of FIG. 5 includes any type of network interface 505. The example interface 505 of FIG. 5 operates in accordance with any of the IEEE 802.3x (a.k.a. Ethernet) family of standards.

To determine (e.g., compute, obtain, and/or otherwise collect) call initiation rate statistics, the example DoS attack detector 125 of FIG. 5 includes a call statistics collector 510. As communication session request information is received from the example S-CSCF server 120, the example call statistics collector 510 of FIG. 5 updates the current call initiation rate (e.g., expressed as X calls per second) for the calling IMS endpoint 105, 106 associated with the communication session request information. The example call statistics collector 510 stores the current call initiation rate in a DoS database 515. The call statistics collector 510 uses the previously computed call initiation rate stored in the DoS database 515 to compute the current call initiation rate. The example call statistics collector 510 of FIG. 5 may, additionally or alternatively, collect and/or obtain the current processing load of an associated IMS core (e.g., the example IMS core 115 of FIG. 1). An example data structure that may be used to implement the example DoS database 515 of FIG. 5 is described below in connection with FIG. 7.

To determine whether a DoS attack is occurring, the example DoS attack detector 125 of FIG. 5 includes a call statistics analyzer 520. Based on call initiation statistics computed by the example call statistics collector 510, the example call statistics analyzer 520 of FIG. 5 determines whether and/or how likely it is that communication session requests associated with one or more IMS endpoints 105, 106 are associated with a DoS attack. The call statistics analyzer 520 can, for example, use call initiation rates (e.g., the number of SIP INVITE messages received over a time interval) and/or a current call processing load of the IMS core 115 to determine whether and/or how likely it is that there is an ongoing and/or active DoS attack. For example, if a particular calling IMS device's call initiation rate exceeds a rate_threshold (e.g., X calls per second), the example call statistics analyzer 520 determines that the calling IMS device is part of a DoS attack. The call statistics analyzer 520 may use one or more additional rate thresholds to determine a likelihood that the calling IMS device is participating in a DoS attack. Additionally or alternatively, if the calling IMS device's call initiation rate does not exceed the rate_threshold but the current call processing load of the IMS core 115 exceeds a load_threshold, the example DoS attack detector 125 checks whether two or more calling IMS devices have call initiation rates that together could represent a call initiation pattern indicative of a potential DoS attack. For example, there may be ten IMS devices each sending SIP INVITE messages at a rate that is less than the rate_threshold, but having a collective call initiation rate exceeding the average call initiation rate supportable by the IMS core 115 and, thus, leading to a potentially loaded condition for the IMS core 115. Such a pattern of activity could be indicative of a distributed DoS attack.

While the example methods and apparatus described herein utilize call initiation rates and/or a current IMS core load to detect a DoS attack, any number and/or type(s) of additional and/or alternative parameters, measurements and/or algorithms may be used to detect DoS attacks. For example, DoS attacks may, additionally or alternatively, be detected by tracking one or more parameters indicative of historical activity by an IMS endpoint and detecting when current activity differs from historical activity. For instance, an IMS endpoint that has historically initiated twelve communication sessions per day, but is now initiating sixty per minute may well be involved in an attack. Moreover, the example call statistics analyzer 520 of FIG. 5 can detect particular communication session requests and/or communication session request types that have caused one or more IMS network 110 and/or IMS core 115 faults and/or errors in the past. When such requests and/or request types are detected, the example call statistics analyzer 520 could provide one or more mitigation rules to the border elements 140, 141, 150, 152 such that particular requests and/or request types can be blocked at the edges of the IMS network 110 and, thus, limit the deleterious effects of such events on the IMS core 115. For example, a SIP message (e.g., a SIP INVITE message) having one or more header fields that have caused errors or faults in the IMS core 115 can be detected, and mitigation rules can be generated to cause the example border elements 140, 141, 150, 152 to block all subsequent SIP messages having one or more of the offending header fields. Such mitigation rules may, in some instances, have nothing to do with an associated call initiation rate, but instead may depend on the content(s) of the SIP message.

To determine how a detected DoS attack is to be mitigated, the example DoS attack detector 125 of FIG. 5 includes a mitigation rule selector 525. When a DoS attack involving one or more calling IMS device is detected, the example mitigation rule selector 525 determines and/or selects one or more mitigation rules, parameters and/or filters to be applied by one or more border elements 140, 141, 150 and/or 152 to mitigate the detected DoS attack(s). Example mitigation rules, parameters and/or filters include, but are not limited to, a maximum allowable call initiation rate for a calling IMS device, a maximum allowable call initiation rate to one or more called IMS devices, a maximum allowable call initiation rate from a border element, a maximum allowable call initiation rate from a particular numbering plan area (NPA) and exchange number (NXX), etc. Mitigation rules, parameters and/or filters may also include specified time durations for which they are to be applied. For example, 50% of calls from a particular IMS device are to be blocked for the next ten minutes.

If in-band protocol signaling is being used to provide DoS attack indications and/or DoS attack mitigation information, the example call statistics analyzer 520 operates in response to each set of communication session request information and/or SIP INVITE message received from the example S-CSCF server 120. Additionally or alternative, if out-of-band protocol signaling is being used to provide DoS attack indications and/or DoS attack mitigation information, the example call statistics analyzer 520 operates periodically or aperiodically at times that need not be associated with the receipt of communication session request information. The example mitigation rule selector 525 of FIG. 5 operates in response to the call statistics analyzer detecting a new, changed or ending DoS attack.

To provide responses to DoS attack queries received from the example S-CSCF server 120 and/or to send SIP NOTIFY messages containing DoS attack mitigation information, the example DoS attack detector 125 of FIG. 5 includes a notifier 530. If in-band protocol signaling is being used and the example call statistics analyzer 520 determines that an IMS device 105, 106 is not associated with a DoS attack, the example notifier 530 of FIG. 5 sends a call admit response to the querying S-CSCF server 120. If the IMS device 105, 106 is associated with a DoS attack, the example notifier 530 provides the DoS attack mitigation rules and/or filters selected by the example mitigation rule selector 525 to the querying S-CSCF server 120. As described above, the S-CSCF server 120 provides the DoS attack mitigation rules and/or filters via, for example, SIP 5XX messages sent to the IMS device 105, 106. If out-of-band protocol signaling is being used, whenever the example mitigation rule selector 525 selects and/or determines new and/or changed DoS attack mitigation rules and/or filters, the example notifier 530 of FIG. 5 sends the DoS attack mitigation rules and/or filters in one or more SIP NOTIFY messages to respective border elements 140, 141, 150 and/or 152.

While an example manner of implementing the example DoS attack detector 125 of FIG. 1 has been illustrated in FIG. 5, one or more of the interfaces, data structures, elements, processes and/or devices illustrated in FIG. 5 may be combined, divided, re-arranged, omitted, eliminated and/or implemented in any other way. Further, the example network interface 505, the example call statistics analyzer 510, the example DoS database 515, the example call statistics analyzer 520, the example mitigation rule selector 525, the example notifier 530 and/or, more generally, the example DoS attack detector 125 of FIG. 5 may be implemented by hardware, software, firmware and/or any combination of hardware, software and/or firmware. Thus, for example, any or all of the example network interface 505, the example call statistics analyzer 510, the example DoS database 515, the example call statistics analyzer 520, the example mitigation rule selector 525, the example notifier 530 and/or, more generally, the example DoS attack detector 125 may be implemented by one or more circuit(s), programmable processor(s), ASIC(s), PLD(s) and/or FPLD(s), etc. When any of the appended claims are read to cover a purely software implementation, at least one of the example network interface 505, the example call statistics analyzer 510, the example DoS database 515, the example call statistics analyzer 520, the example mitigation rule selector 525, the example notifier 530 and/or, more generally, the example DoS attack detector 125 are hereby expressly defined to include a tangible medium such as a memory, a DVD, a CD, etc. Further still, a border element may include interfaces, data structures, elements, processes and/or devices instead of, or in addition to, those illustrated in FIG. 5 and/or may include more than one of any or all of the illustrated interfaces, data structures, elements, processes and/or devices.

Figure 6:
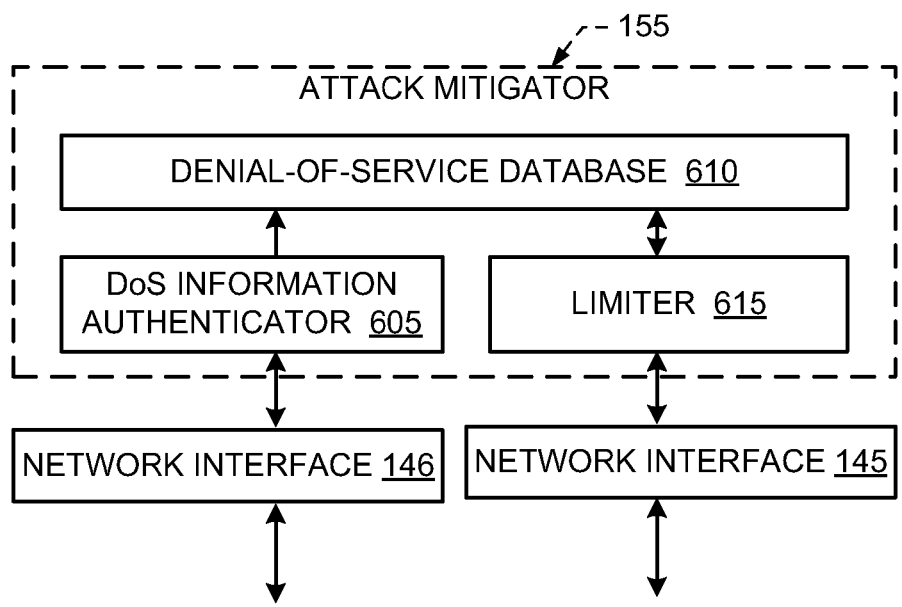
FIG. 6 illustrates an example manner of implementing any or all of the example attack mitigators of FIG. 1.

FIG. 6 illustrates an example manner of implementing any or all of the example attack mitigators 155 of FIG. 1. To authenticate DoS attack mitigation information received from the IMS core 155 via the example network interface 146, the example attack mitigators 155 of FIG. 6 includes a DoS information authenticator 605. As described above, DoS attack mitigation information (e.g., rules, filters and/or parameters) can be received in SIP protocol messages such as, for example, SIP 5XX messages, SIP 200 OK messages and/or SIP NOTIFY messages. In some examples, the example DoS information authenticator 605 of FIG. 6 computes a cryptographic hash of the call dialog identifiers (e.g., the values of the from, to, and call-id fields of the received SIP 5XX or 200 OK message) and the values of a received DoS header (e.g., the example values 325-328 of FIG. 3). Additionally or alternatively, the example DoS information authenticator 605 may further verify the cryptographic hash using a shared and/or private encryption key. The example DoS information authenticator 605 may, additionally or alternatively, be used to authenticate a SIP NOTIFY message used to provide DoS mitigation rules, parameters and/or information by, for example computing a cryptographic hash of the payload 1215 and header fields 1210 (FIG. 12) of the SIP NOTIFY message. If the received DoS mitigation information is authentic, the example DoS information authenticator 605 stores the same in a DoS database 610. An example data structure that may be used to implement the example DoS database 610 of FIG. 6 is described below in connection with FIG. 7.

To limit the ingress of communication session request messages received from a calling IMS endpoint 105, 106, the example attack mitigators 155 of FIG. 6 includes a limiter 615. The example limiter 615 of FIG. 6 checks a local configuration variable (e.g., the example enabled flag 710 of FIG. 7) to determine whether the limiter 615 is to perform DoS attack mitigation. If the limiter 615 is enabled (e.g., the flag contains a value of TRUE), the example limiter 615 of FIG. 6 may update a current call initiation rate for the calling endpoint based on a previously computed call initiation rate for the calling endpoint obtained from the DoS database 610. The example limiter 615 then obtains the maximum allowed call initiation rate for the calling endpoint from the example DoS database 610. If the current call initiation rate exceeds the maximum allowed call initiation rate for the calling endpoint, the request communication session is rejected and the attack mitigator 155 responds to the calling IMS endpoint with a SIP 5XX response message. If the current call initiation rate does not exceed the maximum allowed call initiation rate for the calling endpoint, the request communication session is accepted and the attack mitigator 155 forwards the communication session request message to an IMS core (e.g., the example IMS core 115 of FIG. 1).

Additionally or alternatively, the example limiter 615 of FIG. 6 may compare one or more parameters of the communication session request message with one or more parameters of a DoS attack mitigation rule and/or filter. For example, by comparing a telephone number associated with a calling party 105, 106 with a range of telephone numbers associated with an active DoS attack mitigation rule and/or filter. If the telephone number matches the rule and/or filter, the limiter 615 applies the action specified by the mitigation rule and/or filter. For example, the limiter 615 blocks all such calls or allows 50% of such calls. Such DoS attack mitigation rules and/or filters may be applied, in some example, independently of any current call initiation rate associated with the calling IMS device 105, 106.

While an example manner of implementing any or all of the example attack mitigators 155 of FIG. 1 has been illustrated in FIG. 6, one or more of the interfaces, data structures, elements, processes and/or devices illustrated in FIG. 6 may be combined, divided, re-arranged, omitted, eliminated and/or implemented in any other way. Further, the example DoS information authenticator 605, the example DoS database 610, the example limiter 615 and/or, more generally, the example attack mitigators 155 of FIG. 6 may be implemented by hardware, software, firmware and/or any combination of hardware, software and/or firmware. Thus, for example, any or all of the example DoS information authenticator 605, the example DoS database 610, the example limiter 615 and/or, more generally, the example attack mitigators 155 may be implemented by one or more circuit(s), programmable processor(s), ASIC(s), PLD(s) and/or FPLD(s), etc. When any of the appended claims are read to cover a purely software implementation, at least one of the example DoS information authenticator 605, the example DoS database 610, the example limiter 615 and/or, more generally, the example attack mitigators 155 are hereby expressly defined to include a tangible medium such as a memory, a DVD, a CD, etc.

Further still, a border element may include interfaces, data structures, elements, processes and/or devices instead of, or in addition to, those illustrated in FIG. 6 and/or may include more than one of any or all of the illustrated interfaces, data structures, elements, processes and/or devices.

Figure 7:
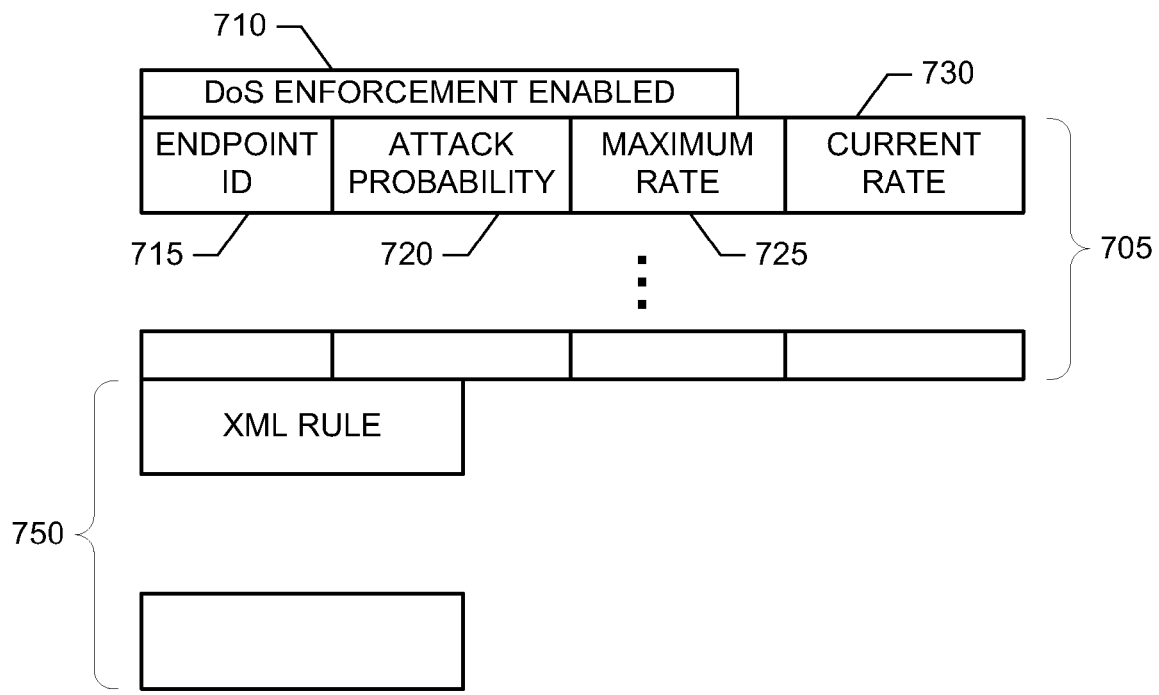
FIG. 7 illustrates an example data structure that may be used to implement any or all of the example DoS databases of FIGS. 5 and/or 6.

FIG. 7 illustrates an example data structure that may be used to implement either or both of the example DoS database 515 of FIG. 5 and/or the example DoS database 610 of FIG. 6. The example data structure of FIG. 7 includes a plurality of entries 705 for respective ones of a plurality of IMS endpoints. The data structure of FIG. 7 also includes an enabled field 710. The example enabled field 710 contains a binary value (e.g., TRUE or FALSE) indicating whether a limiter (e.g., the example limiter 615 of FIG. 6) is enabled to perform DoS attack mitigation.

To identify a calling IMS device, each of the example entries 705 of FIG. 7 includes an endpoint identifier field 715. The example endpoint identifier field of FIG. 7 contains a value and/or alphanumeric string (e.g., a SIP uniform resource identifier (URI) or an IP address) that uniquely identifies a particular IMS endpoint.

To store a probability of attack, each of the example entries 705 of FIG. 7 includes an attack probability field 720. The example attack probability field 720 of FIG. 7 contains a value representative of the likelihood and/or probability that the associated IMS endpoint is participating in a DoS attack.

To store a maximum allowable call initiation rate, each of the example entries 705 of FIG. 7 includes a maximum rate field 725. The example maximum rate field 725 of FIG. 7 contains a value that represents the maximum rate at which the IMS core 115 will accept communication session request messages from the associated IMS endpoint. If the example maximum rate field 725 contains a negative value (e.g., negative one), then DoS attack mitigation is not implemented and/or carried out for the associated IMS endpoint.

To store a current call initiation rate, each of the example entries 705 of FIG. 7 includes a current rate field 730. The example current rate field 730 of FIG. 7 contains a value that represents the current rate at which the associated IMS endpoint has been attempting to submit communication session request messages.

To store DoS attack mitigation rules and/or filters, the example data structure of FIG. 7 may include one or more rule fields 750. Each of the example rule fields 750 of FIG. 7 contain XML-based text representative of a DoS mitigation rule and/or filter.

While an example data structure that may be used to implement either or both of the example DoS database 515 of FIG. 5 and/or the example DoS database 610 of FIG. 6 is illustrated in FIG. 7, the example data structure of FIG. 7 may be implemented using any number and/or type(s) of other and/or additional fields and/or data. Further, the fields and/or data illustrated in FIG. 7 may be combined, divided, re-arranged, eliminated and/or implemented in any way. Moreover, the example data structure may include fields and/or data in addition to, or instead of, those illustrated in FIG. 7, and/or may include more than one of any or all of the illustrated fields and/or data.

Figure 8:
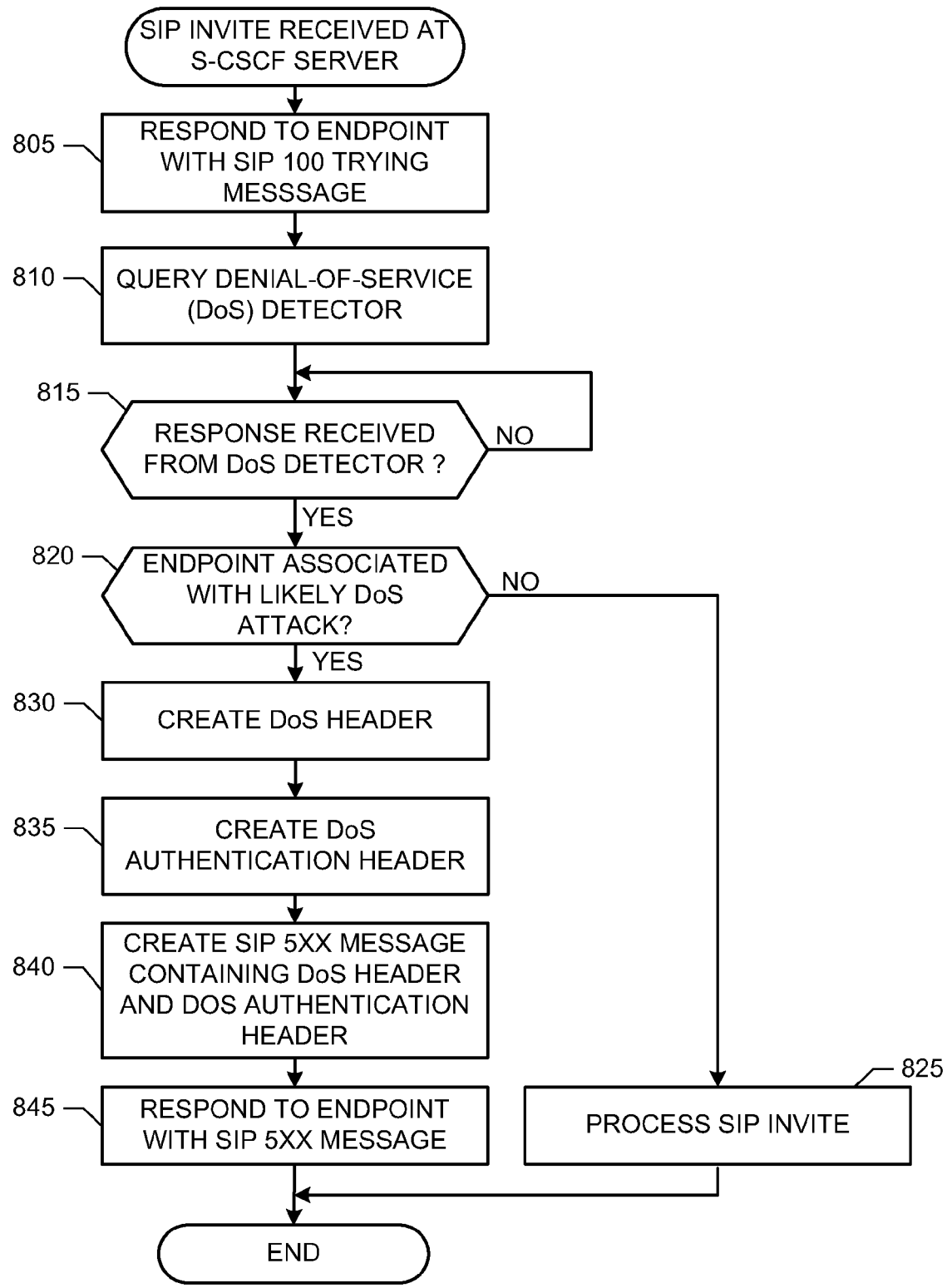
FIG. 8 is a flowchart representative of example machine accessible instructions that may be executed by, for example, a processor to implement any or all of the example S-CSCF servers of FIGS. 1 and/or 4.
Figure 9:
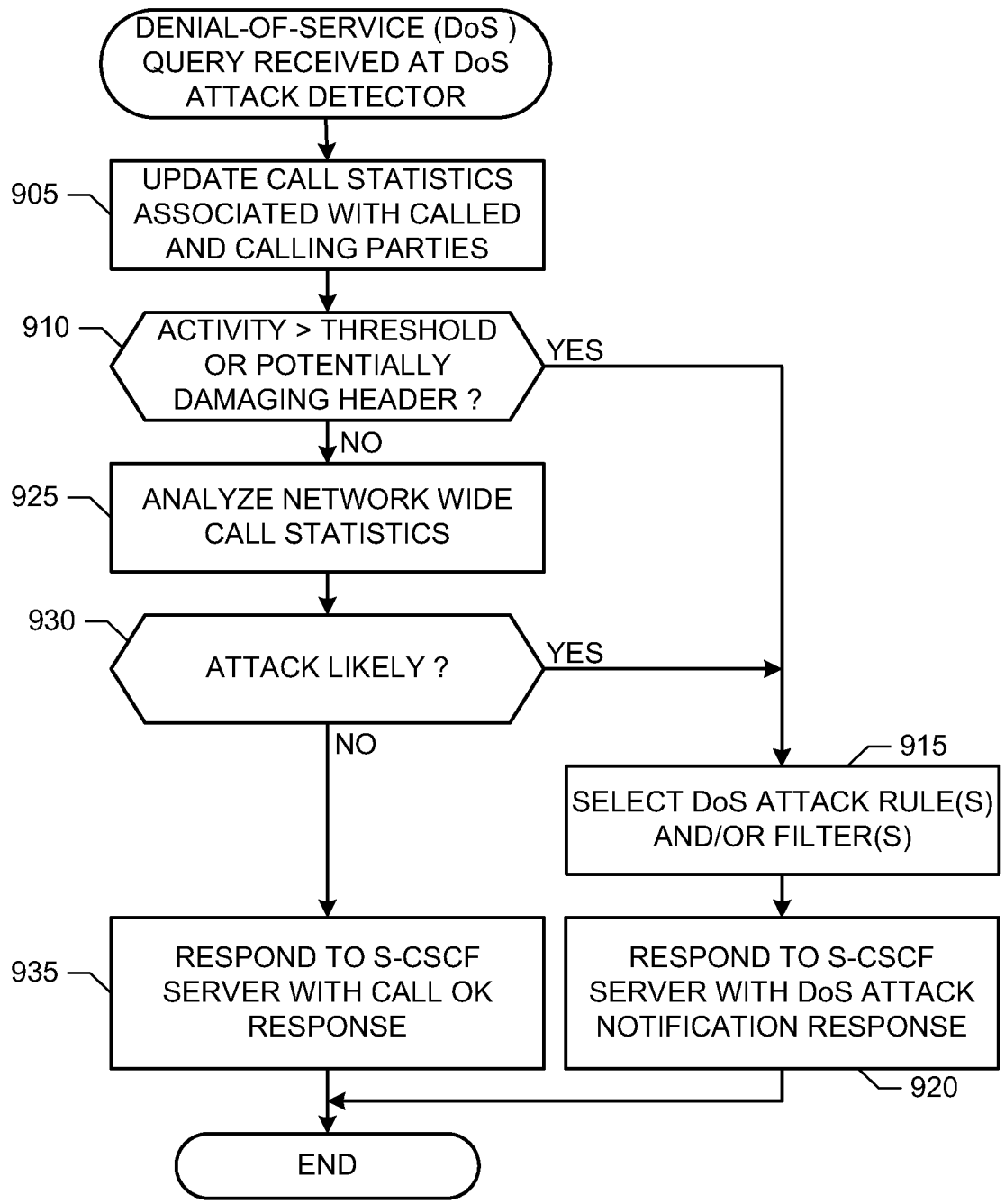
FIG. 9 is a flowchart representative of example machine accessible instructions that may be executed by, for example, a processor to implement any or all of the example DoS attack detectors of FIGS. 1 and/or 5.

FIG. 8 illustrates example machine accessible instructions that may be executed to implement any or all of the example S-CSCF servers 120 of FIGS. 1 and/or 4. FIG. 9 illustrates example machine accessible instructions that may be executed to implement any or all of the example DoS attack detectors 125 of FIGS. 1 and/or 5. FIG. 9 illustrates example machine accessible instructions that may be executed to implement any or all of the example attack mitigators 155 of FIGS. 1 and/or 6. The example machine accessible instructions of FIGS. 8, 9 and 10 may be collectively used by the example IMS network 110 of FIG. 1 to perform DoS attack detection and to provide DoS attack indications and/or DoS attack mitigation information via in-band protocol signaling.

The example machine accessible instructions of FIGS. 8, 9 and/or 10 may be carried out by a processor, a controller and/or any other suitable processing device. For example, the example machine accessible instructions of FIGS. 8, 9 and/or 10 may be embodied in coded instructions stored on a tangible medium such as a flash memory, a read-only memory (ROM) and/or random-access memory (RAM) associated with a processor (e.g., the example processor 9005 discussed below in connection with FIG. 17). Alternatively, some or all of the example machine accessible instructions of FIGS. 8, 9 and/or 10 may be implemented using any combination(s) of ASIC(s), PLD(s), FPLD(s), discrete logic, hardware, firmware, etc. Also, some or all of the example machine accessible instructions of FIGS. 8, 9 and/or 10 may be implemented manually or as any combination of any of the foregoing techniques, for example, any combination of firmware, software, discrete logic and/or hardware. Further, many other methods of implementing the example operations of FIGS. 8, 9 and/or 10 may be employed. For example, the order of execution of the blocks may be changed, and/or one or more of the blocks described may be changed, eliminated, subdivided, or combined. Additionally, any or all of the example machine accessible instructions of FIGS. 8, 9 and/or 10 may be carried out sequentially and/or carried out in parallel by, for example, separate processing threads, processors, devices, discrete logic, circuits, etc.

The example machine accessible instructions of FIG. 8 begin when the example network interface 405 of FIG. 4 receives a communication session request message (e.g., a SIP INVITE message) from a calling IMS endpoint 105, 106. The example SIP server module 410 responds with a SIP 100 TRYING message (block 805), and the example DoS module 415 queries the example DoS attack detector 125 of FIG. 1 to determine whether the calling IMS endpoint 105, 106 is associated with a DoS attack (block 810). The DoS module 415 waits for a response from the DoS attack detector 125 (block 815).

If the response indicates that the calling IMS device 105, 106 is not associated with a likely DoS attack (block 820), the example SIP server module 410 of FIG. 4 processes the SIP INVITE message in accordance with any past, present and/or future SIP protocol standard and/or specification (block 825). Control then exits from the example machine accessible instructions of FIG. 8.

Returning to block 820, if the response received from the DoS attack detector 125 indicates that the calling IMS endpoint is associated with a DoS attack (block 820), the example DoS module 415 of FIG. 4 creates a DoS header (e.g., the example DoS header 315 of FIG. 3) (block 830) and a DoS authentication header (e.g., the example DoS authentication header 320) (block 835). The example SIP server module 410 creates a SIP 5XX message containing the DoS header and the DoS authentication header (block 840), and sends the SIP 5XX message to the calling IMS endpoint (block 845). Control then exits from the example machine accessible instructions of FIG. 8.

The example machine accessible instructions of FIG. 9 begin when the example DoS attack detector 125 of FIG. 1 receives a DoS attack query from the example DoS module 415 of FIG. 4. The example call statistics collector 510 of FIG. 5 updates the call statistics for the calling IMS endpoint, the called endpoint and/or the border element associated with the communication session request (block 905). The example call statistics analyzer 420 determines if the current call initiation rate for the calling IMS endpoint exceeds a rate_threshold or if the query is associated with a SIP INVITE message having a potentially damaged or damaging header (block 910).

If the current rate exceeds the threshold or the query is associated with a SIP INVITE message having a potentially damaged or damaging header (block 910), the example mitigation rule selector 525 determines one or more mitigation rules (e.g., a maximum allowable call initiation rate) to be applied to the calling IMS endpoint (block 915). The example notifier 530 responds to the DoS module 415 indicating that the calling IMS endpoint is associated with a DoS attack and providing the selected mitigation rule(s) to the DoS checker 315 (block 920). Control then exits from the example machine accessible instructions of FIG. 9.

Returning to block 910, if the current rate does not exceed the threshold and the query is not associated with a SIP INVITE message having a potentially damaged or damaging header (block 910), the call statistics analyzer 520 analyzes network wide call statistics to determine if there is a distributed DoS attack (block 925). If it is likely that the calling IMS endpoint is part of a distributed DoS attack (block 930), control proceeds to block 915 to selected DoS attack mitigation rules and/or filters.

Returning to block 930, if it is not likely that the calling IMS endpoint is part of a distributed DoS attack (block 930), the notifier 530 responds to the DoS module 415 indicating that the calling IMS endpoint is not associated with a DoS attack (block 935). Control then exits from the example machine accessible instructions of FIG. 9.

Figure 10:
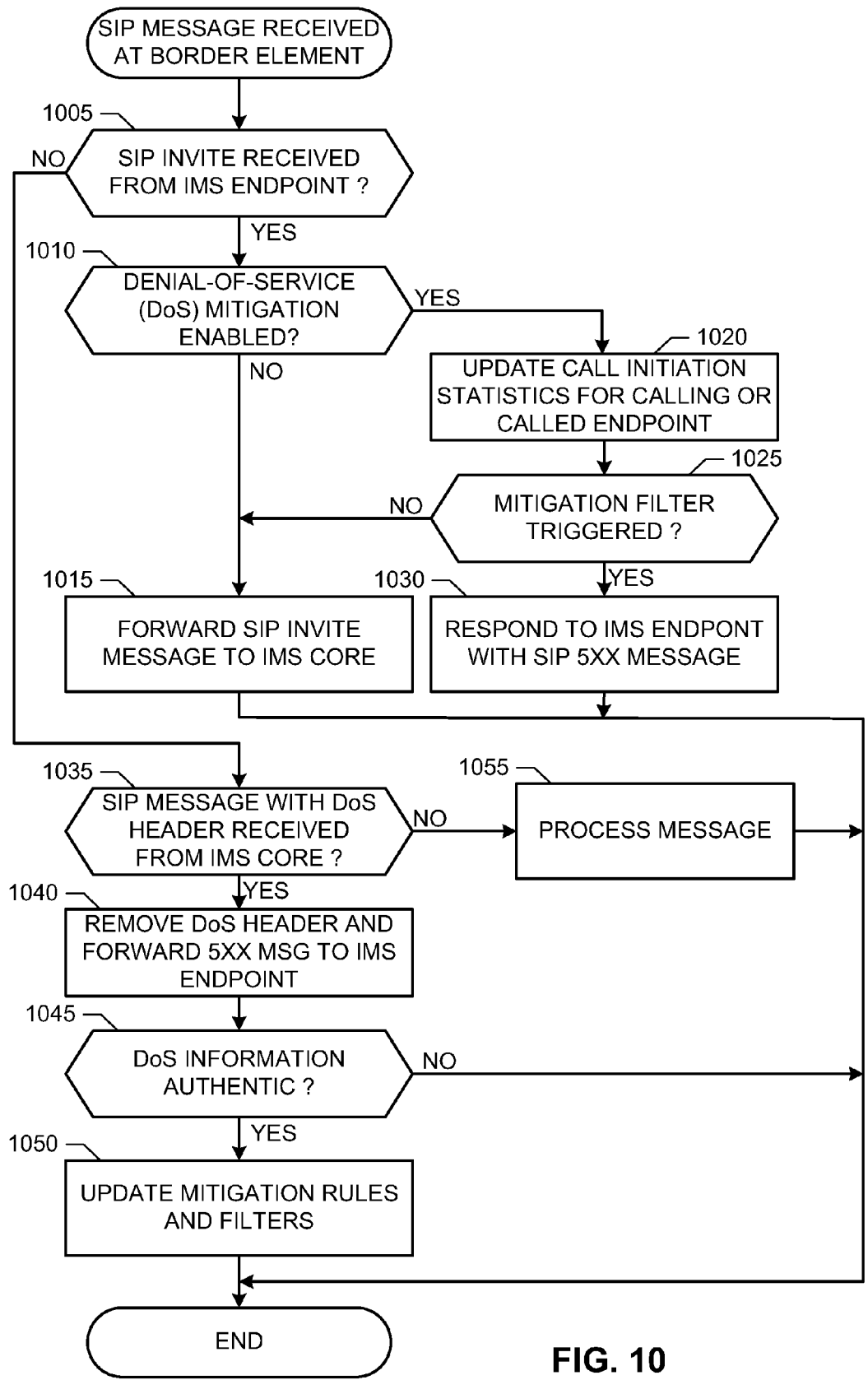
FIG. 10 is a flowchart representative of example machine accessible instructions that may be executed by, for example, a processor to implement any or all of the example attack mitigators of FIGS. 1 and/or 6.

The example machine accessible instructions of FIG. 10 begin when a SIP protocol message is received at a border element 140, 141, 150 and/or 152. If the received SIP protocol message is a SIP INVITE message (block 1005), the example limiter 615 determines if it is enabled to perform DoS attack mitigation (block 1010). If the limiter 615 is not enabled to perform DoS attack mitigation (block 1010), the border element 140, 141, 150, 152 implementing the attack mitigator 155 forwards the communication session request message to the IMS core 115 (block 1015). In some examples, the border element 140, 141, 150, 152 adds a border element identifier to the SIP INVITE message before forwarding the same to the IMS core 115. Control then exits from the example machine accessible instructions of FIG. 10.

If the limiter 615 is enabled to perform DoS attack mitigation (block 1010), the limiter 615 updates the current call initiation statistics for the calling and/or called IMS endpoints associated with the request (block 1020). The limiter 615 determines if the updated statistics or any parameters associated with the SIP INVITE message are such that any mitigation rules and/or filters have been triggered (block 1025). If no mitigation rules and/or filters have been triggered (block 1025), control proceeds to block 1015 to forward the SIP INVITE message to the IMS core 115.

Returning to block 1025, if one or more mitigation rules and/or filters have been triggered (block 1025), the border element 140, 141, 150, 152 responds to the calling IMS endpoint with a SIP 5XX message to reject the requested communication session (block 1030). Control then exits from the example machine accessible instructions of FIG. 10.

Returning to block 1005, if a SIP message (e.g., a SIP 5XX or a SIP 200 OK message) containing a DoS header was received (block 1035), the attack mitigator 155 removes the DoS header and the DoS authentication header and forwards the modified SIP 5XX message to the IMS endpoint (block 1040). If the DoS information authenticator 605 is able to properly authenticate the DoS header (block 1045), the DoS information authenticator 605 stores the one or more mitigation parameters, data, rules and/or filters received in the DoS header in the example DoS database 610 (block 1050). Control then exits from the example machine accessible instructions of FIG. 10. If the DoS header cannot be authenticated (block 1045), control exits from the example machine accessible instructions of FIG. 10 without updating the DoS database 610.

Returning to block 1040, if neither a SIP INVITE nor a SIP message containing a DoS header was received (block 1040), the example border element 140, 141, 150, 152 processes the received message in accordance with any past, present and/or future SIP protocol standard and/or specification (block 1055). Control then exits from the example machine accessible instructions of FIG. 10.

Figure 11A:
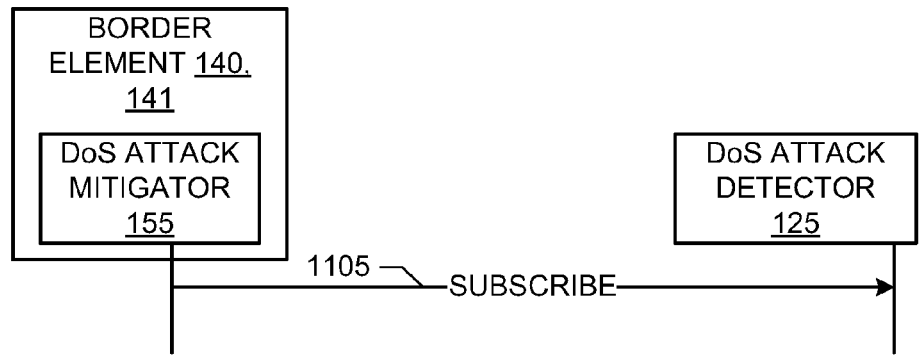
FIGS. 11A-C illustrate example out-of-band message protocol exchanges that may carried out by the example IMS network of FIG. 1 to detect and mitigate a DoS attack.
Figure 11B:
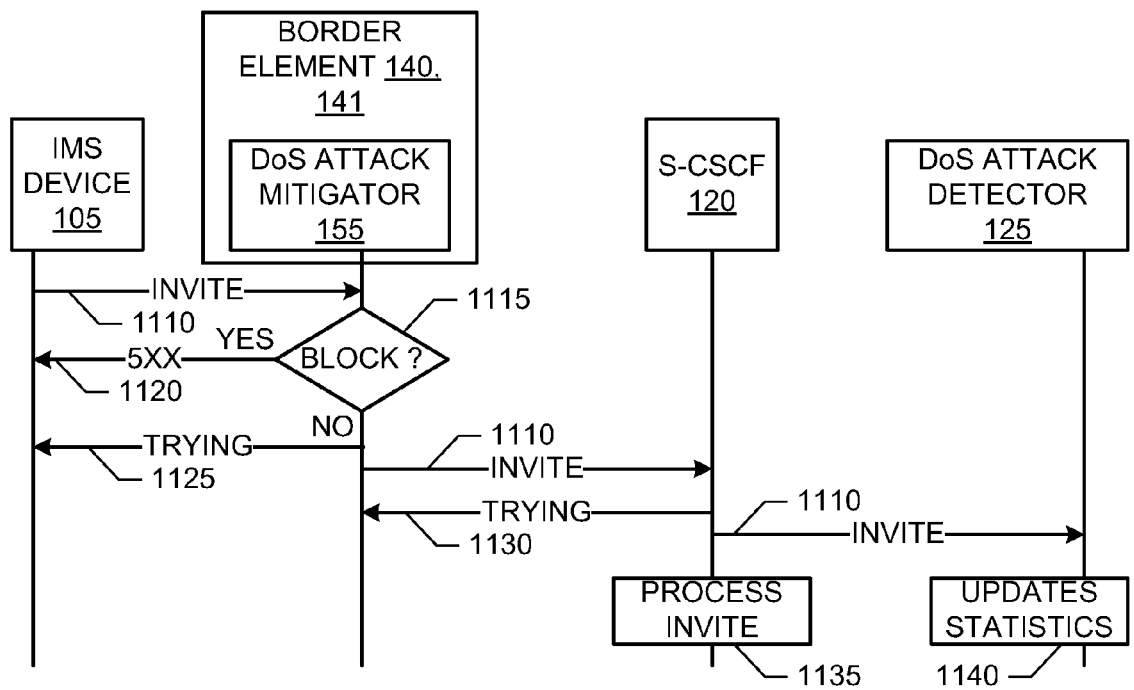
Figure 11C:
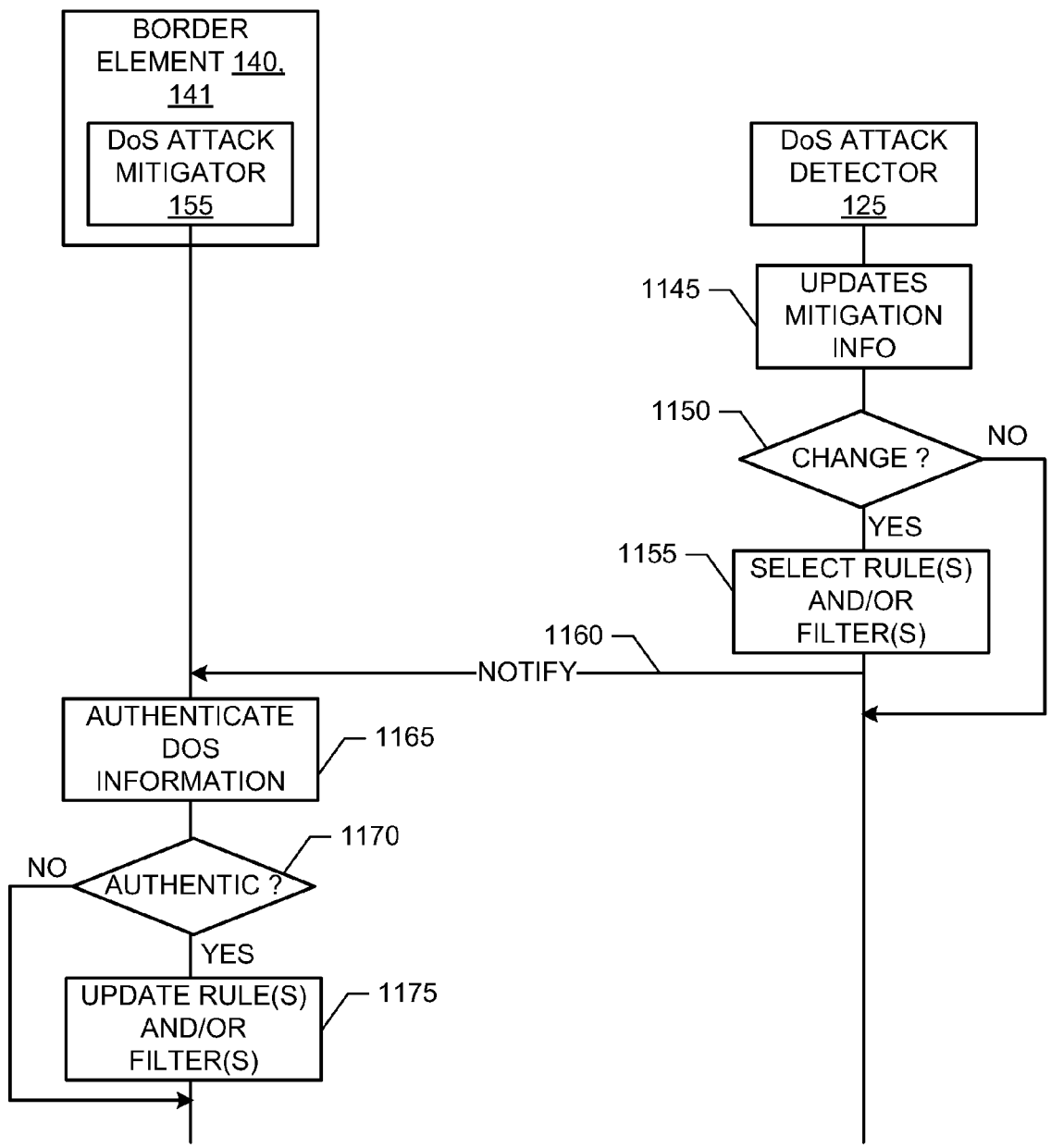

FIGS. 11A-11C illustrate example out-of-band message protocol exchanges that may carried out by the example IMS network 110 of FIG. 1 to detect and mitigate a DoS attack. While example methods and apparatus described above in connection with FIGS. 2, 8, 9 and/or 10 insert DoS headers and DoS authentication headers into SIP protocol response messages, such as SIP 5XX and SIP 200 OK messages. Other methods of determining and/or conveying DoS attack mitigation parameters (e.g., by using out-of-band SIP protocol messages) may, additionally or alternatively, be used. For example, as shown in FIG. 11A, an attack mitigator 155 can send a SIP SUBSCRIBE message 1105 to the IMS core 115 (e.g., to the example DoS attack detector 125) to notify the IMS core 115 that the border element 140, 141, 150, 152 supports DoS attack mitigation. In some examples, a SIP SUBSCRIBE message 1105 sent by a particular attack mitigator 155 to the IMS core 115 includes additional information, data and/or parameters that specify the DoS attack mitigation capabilities of the attack mitigator 155.

The example protocol message exchanges of FIG. 11B begin with the example IMS device 105 sending a SIP INVITE message 1110 to a border element 140, 141 implementing the DoS attack mitigator 155. The example DoS attack mitigator 155 of FIG. 11B determines, based on currently active DoS attack mitigation rules and/or filters, whether the requested communication session request is to be blocked (block 1115). For example, the DoS attack mitigator 155 can compare a call initiation rate associated with the IMS device 105 with a threshold, and/or compare an identifier associated with the IMS device 105 to a list of identifiers specified in a DoS attack mitigation rule. If the requested communication session is to be blocked (block 1115), the DoS attack mitigator 155 sends a SIP 5XX response message 1120 to the IMS device 105.

If the requested communication session is not to be blocked (block 1115), the DoS attack mitigator 155 responds to the IMS device 105 with a SIP 100 TRYING message 1125 and forwards the SIP INVITE message 1110 to the example S-CSCF 120. The S-CSCF server 120 responds to the SIP INVITE message 1110 by sending a SIP 100 TRYING message 1130 and sending the SIP INVITE message 1110 and/or one or more parameters of the message 1110 to the example DoS attack detector 125. The S-CSCF server 120 of FIG. 11B processes the SIP INVITE message 1110 in accordance with any past, present and/or future SIP protocol standard and/or specification (block 1135). The example DoS attack detector 125 (e.g., the example call statistics collector 510 of FIG. 5) updates call initiation statistics based on the SIP INVITE message 1110 (block 1140).

As shown in FIG. 11C, the DoS attack detector 125 periodically and/or aperiodically updates DoS attack determinations and sends SIP NOTIFY messages to the border element 140, 141, 150, 152 to direct the attack mitigators 155 whether and/or how to perform DoS attack mitigation (e.g., enforce a maximum allowable call initiation rate) for particular calling and/or called IMS endpoints and/or for particular peered border elements 150 and 152. Moreover, while the example SIP protocol response messages (e.g., SIP 5XX and/or SIP 200 OK messages) described above contain DoS attack mitigation parameters, rules and/or filters for a particular IMS endpoint, the example SIP NOTIFY messages described below may contain DoS attack mitigation parameters, rules and/or filters that apply to one or more IMS endpoints.

The example protocol message exchanges of FIG. 11C begin when the example DoS attack detector 125 (e.g., the example call statistics analyzer 520 of FIG. 5) makes a new and/or additional DoS attack determination (block 1145). Any of the example methods, logic and/or criteria described above in connection with FIGS. 1-10 may be used to determine if a DoS attack has started, ended and/or changed. If a DoS attack has started, ended or changed (block 1150), the example mitigation rule selector 525 (FIG. 5) selects or changes one or more DoS attack mitigation rules and/or filters (block 1155). The example notifier 530 sends the new or changed DoS attack mitigation rules and/or filters to the DoS attack mitigator 155 via one or more SIP NOTIFY messages 1160.

In response to the SIP NOTIFY message 1160, the example DoS attack mitigator 155 authenticates the received DoS information (block 1165). If the DoS information is authentic (block 1170), the DoS attack mitigator 155 updates its local DoS database 610 (block 1175).

FIG. 12 illustrates another example data structure that may be used to implement a SIP message, such as a SIP NOTIFY message. To identify the SIP message, the example data structure of FIG. 12 includes a name field 1205. The example name field 1205 of FIG. 12 includes an alphanumeric string that identifies the SIP message and identifies a destination for the example message. The example SIP message illustrated in FIG. 12 is a SIP NOTIFY message and, thus, the example name field 1205 contains a string that includes "NOTIFY". Such a SIP message may be sent to a border element 140, 141, 150 and/or 152 to, for example, update and/or set one or more DoS attack mitigation parameters, rules, and/or filters to be applied by an attack mitigator 155. In the illustrated example, the SIP message is addressed to "bor_elem_id." The name field 1205 could be used to identify any type of SIP message to any applicable destination(s).

To provide additional values and/or parameters, the example data structure of FIG. 12 includes one or more header fields 1210. Example header fields 1210 include, but are not limited to, a from field, a caller identification field, a DoS authentication header 1215 and/or a command sequence number field. The number of header fields 1210, in some examples, depends upon the type of SIP message and/or the protocol(s) implemented by either endpoint.

To provide additional data and/or parameters, the example data structure of FIG. 12 includes a payload field 1220. The example payload field 1220 of FIG. 12 includes, possibly among other things, one or more XML-based text blocks that specify one or more mitigation parameters, rules and/or filters to be applied by an attack mitigator 155. Example XML-based text blocks that may be used to specify DoS attack mitigation information are described below in connection with FIGS. 13A and 13B.

To allow the example XML-based text block(s) 1220 and/or the entire SIP message of FIG. 12 to be authenticated, the example data structure of FIG. 12 includes the example DoS authentication header 1215. The example DoS authentication header 1215 of FIG. 12 allows a receiver of the example SIP message of FIG. 12 to valid the authenticity of the XML-based DoS attack mitigation information 1220 to thereby avoid abuse and/or frustrate techniques aimed at disabling DoS mitigation for the example IMS network 110 of FIG. 1.

The example DoS authentication header 1215 of FIG. 12 contains a value that represents a cryptographic hash of the call dialog identifiers (e.g., the values of the from, to, and call-id fields of the example data structure of FIG. 12) and the text of the example payload 1220. In some instances, the cryptographic hash may be digitally signed using a shared and/or private key. Additionally or alternatively, the cryptographic hash only includes the portion of the payload 1220 that represents DoS attack mitigation information.

While an example data structure that may be used to implement a SIP protocol message is illustrated in FIG. 12, a SIP protocol message may be implemented using any number and/or type(s) of other and/or additional fields and/or data. Further, the fields and/or data illustrated in FIG. 12 may be combined, divided, re-arranged, eliminated and/or implemented in any way. Moreover, a SIP protocol message may include fields and/or data in addition to, or instead of, those illustrated in FIG. 12, and/or may include more than one of any or all of the illustrated fields and/or data.

FIGS. 13A and 13B illustrate example XML based DoS text blocks that may be used to implement DoS attack mitigation parameters, data, rules and/or filters. For ease of explanation and understanding, the example DoS text blocks of FIGS. 13A and 13B represent "pseudo" XML text and are intended to illustrate the manner in which DoS mitigation information can be specified via XML text without overcomplicating the examples to ensure strict adherence to any past, present and/or future XML specifications. To specify a mitigation filter, the example XML-based DoS text block 1305 of FIG. 13A includes a filter specification text block 1310. The example filter specification text block 1310 of FIG. 13A contains one or more criteria 1315 and 1316 that identify the communication session request messages to which the XML-based DoS text block 1305 applies. The example criteria 1315 and 1316 identify request messages sent "From" any IMS endpoint associated with the NPANXX of "314390." While the example criteria 1316 of FIG. 13A specifies a group and/or range of IMS endpoints associated with a particular NPANXX, a DoS text block 1305 may, additionally or alternatively, identify one or more specific endpoints.

To specify an action to be applied when a communication session request satisfies the filter specified by the filter specification text block 1310, the example XML-based DoS text block 1305 of FIG. 13A includes an action text block 1320. The example action text block 1320 of FIG. 13A specifies that 50% of calls that satisfy the filter specification 1310 are to be rejected.

To specify a duration over which the action 1320 is to be applied, the example XML-based DoS text block 1305 of FIG. 13A includes a duration text block 1325. The example duration text block 1325 of FIG. 13A specifies that the action 1320 is to be applied for 3600 seconds (i.e., one hour).

The example XML-based text block 1330 of FIG. 13B is similar to the example XML-based text block 1305 of FIG. 13A. However, the example action text block 1335 of FIG. 13B specifies that 100% of the calls satisfying the filter specification text 1310 are to be allowed. Moreover, the example duration text block 1340 of FIG. 13B specifies that the filter 1310 is to applied indefinitely, as signified by the duration 1340 having a value of zero seconds.

The example XML-based text of FIG. 13A may be sent to a border element to initiate DoS attack mitigation, and the example XML-based text of FIG. 13B may be used to indicate that the DoS attack mitigation no longer needs to be applied. For example, if part way through the duration 1325 the DoS attack detector 125 determines that the suspected DoS attack has ended, the DoS attack detector 125 can send the example XML-based text of FIG. 13B to turn off the previously activated DoS attack mitigation filter.

While single XML-based DoS text blocks 1305 and 1335 are shown in FIGS. 13A and 13B, a SIP NOTIFY message and/or a SIP 5XX message may contain any number of DoS text blocks 1305, 1335, which are based on XML and/or any other rule-based language. Moreover, a DoS text block 1305, 1335 may include any number of filter specifications 1310. If multiple filter specifications 1310 are included in a DoS text block 1305, 1330, then the action text 1320, 1335 and the duration text 1325, 1340 apply to all filter specifications 1310 of the DoS text block 1305, 1330. However, any combinations of filter specifications 1310 and actions 1320 and 1335 could be implemented.

Figure 14:
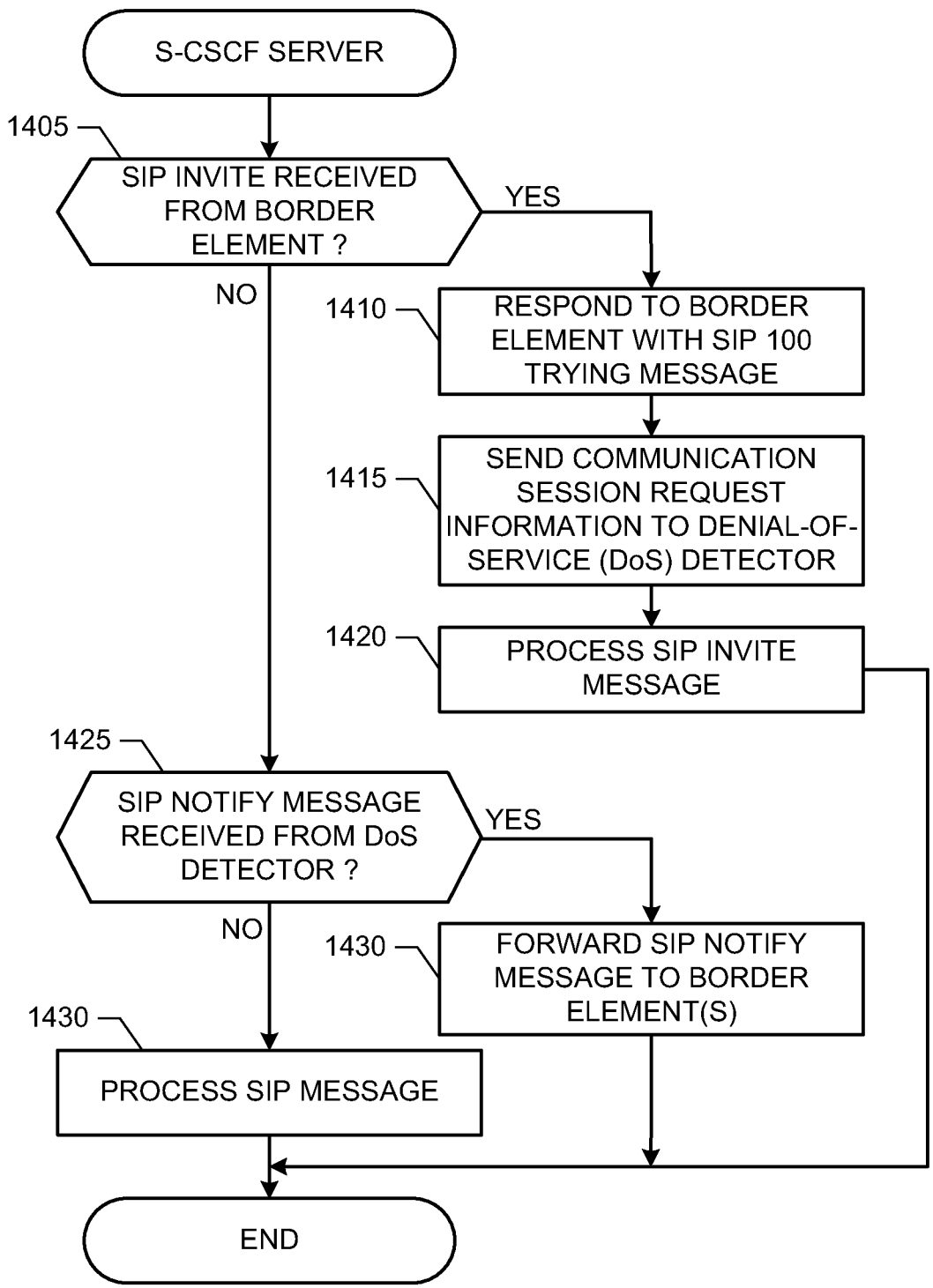
FIG. 14 is a flowchart representative of additional example machine accessible instructions that may be executed by, for example, a processor to implement any or all of the example S-CSCF servers of FIGS. 1 and/or 4.
Figure 15:
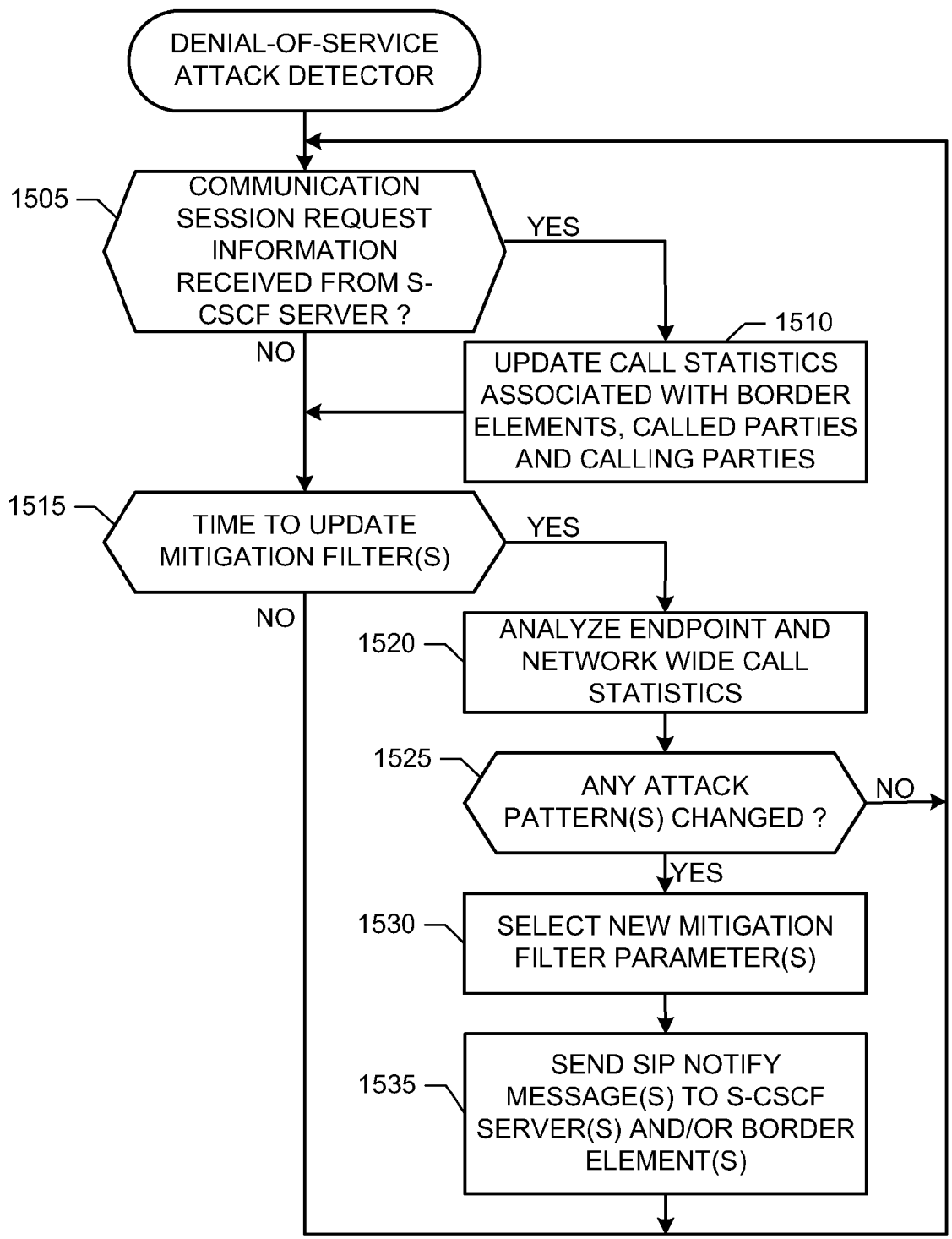
FIG. 15 is a flowchart representative of additional example machine accessible instructions that may be executed by, for example, a processor to implement any or all of the example DoS attack detectors of FIGS. 1 and/or 5.
Figure 16:
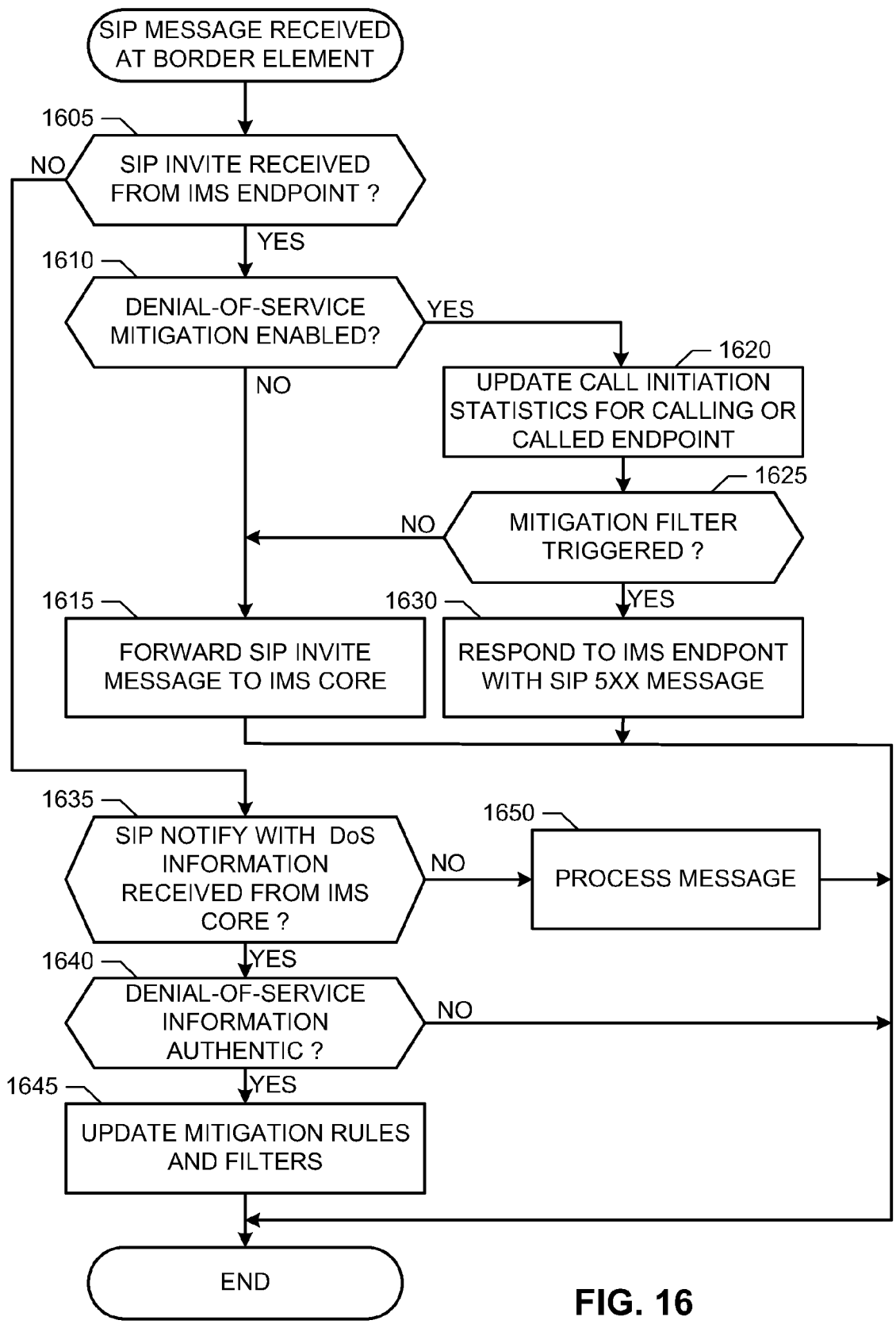
FIG. 16 is a flowchart representative of additional example machine accessible instructions that may be executed by, for example, a processor to implement any or all of the example attack mitigators of FIGS. 1 and/or 6.

FIG. 14 illustrates example machine accessible instructions that may be executed to implement any or all of the example S-CSCF servers 120 of FIGS. 1 and/or 4. FIG. 15 illustrates additional example machine accessible instructions that may be executed to implement any or all of the example DoS attack detectors 125 of FIGS. 1 and/or 5. FIG. 16 illustrates additional example machine accessible instructions that may be executed to implement any or all of the example attack mitigators 155 of FIGS. 1 and/or 6. The example machine accessible instructions of FIGS. 14, 15 and 16 may be collectively used by the example IMS network 110 of FIG. 1 to perform DoS attack detection and to provide DoS attack indications and/or DoS attack mitigation information via out-of-band protocol signaling.

The example machine accessible instructions of FIGS. 14, 15 and/or 16 may be carried out by a processor, a controller and/or any other suitable processing device. For example, the example machine accessible instructions of FIGS. 14, 15 and/or 16 may be embodied in coded instructions stored on a tangible medium such as a flash memory, a ROM and/or RAM associated with a processor (e.g., the example processor 9005 discussed below in connection with FIG. 17). Alternatively, some or all of the example machine accessible instructions of FIGS. 14, 15 and/or 16 may be implemented using any combination(s) of ASIC(s), PLD(s), FPLD(s), discrete logic, hardware, firmware, etc. Also, some or all of the example machine accessible instructions of FIGS. 14, 15 and/or 16 may be implemented manually or as any combination of any of the foregoing techniques, for example, any combination of firmware, software, discrete logic and/or hardware. Further, many other methods of implementing the example operations of FIGS. 14, 15 and/or 16 may be employed. For example, the order of execution of the blocks may be changed, and/or one or more of the blocks described may be changed, eliminated, sub-divided, or combined. Additionally, any or all of the example machine accessible instructions of FIGS. 14, 15 and/or 16 may be carried out sequentially and/or carried out in parallel by, for example, separate processing threads, processors, devices, discrete logic, circuits, etc.

The example machine accessible instructions of FIG. 14 begin when the example S-CSCF server 120 receives a SIP protocol message. If a SIP INVITE message is received from a border element 140, 141, 150, 152 (block 1405), the example SIP server module 410 of FIG. 4 responds with a SIP 100 TRYING message (block 1410). The example DoS module 415 sends the SIP INVITE message and/or communication session request information contained in the SIP INVITE message to the example DoS attack detector 125 (block 1415). The SIP server module 410 processes the SIP INVITE message in accordance with any past, present and/or future SIP protocol standard and/or specification (block 1420). Control then exits from the example machine accessible instructions of FIG. 14.

Returning to block 1405, if a SIP NOTIFY message is received from the DoS attack detector 125 (block 1425), the DoS module 415 forwards the SIP notify message to the corresponding border element(s) 140, 141, 150, 152 (block 1430). Control then exits from the example machine accessible instructions of FIG. 14.

Returning to block 1425, if any other SIP protocol message is received (block 1425), the example SIP server module 410 processes the SIP protocol message in accordance with any past, present and/or future SIP protocol standard and/or specification (block 1430). Control then exits from the example machine accessible instructions of FIG. 14.

The example machine accessible instructions of FIG. 15 begin with the example call statistics collector 510 of FIG. 5 checking if communication session request information and/or a SIP INVITE message containing the same have been received from the example S-CSCF server 120 (block 1505). If such information is received (block 1505), the example call statistics collector 510 updates the call statistics for the calling IMS endpoint, the called endpoint and/or the border element associated with the communication session request (block 1510).

Returning to block 1505, if communication session request information and/or a SIP INVITE message containing the same has not been received (block 1505), the example call statistics analyzer 520 of FIG. 5 determines if it is time to update any DoS attack mitigation rules and/or filters (block 1515). If it is not time to update a DoS attack mitigation rule or filter (block 1515), control returns to block 1505 to check for communication session request information.

If it is time to update a DoS attack mitigation rule or filter (block 1515), the example call statistics analyzer 420 analyzes endpoint and/or network-wide call initiation statistics (block 1520). If the updated endpoint and/or network-wide call initiation statistics indicate that a DoS attack has started, ended or changed (block 1525), the example mitigation rule selector 525 of FIG. 5 selects and/or modified one or more DoS mitigation rules and/or filters (block 1530). The example notifier 530 sends one or more SIP NOTIFY messages containing the new and/or updated DoS mitigation rules and/or filters to the corresponding border elements 140, 141, 150 and 152 (block 1535). In some example, the SIP NOTIFY messages are sent to the border elements 140, 141, 142 and 152 via the example DoS module 415 of FIG. 4. Control then returns to block 1505 to check for communication session request information.

Returning to block 1525, if the updated endpoint and/or network-wide call initiation statistics do not indicate that a DoS attack has started, ended or changed (block 1525), control returns to block 1505 to check for communication session request information.

The example machine accessible instructions of FIG. 16 begin when a SIP protocol message is received at a border element 140, 141, 150 and/or 152. If the received SIP protocol message is a SIP INVITE message (block 1605), the example limiter 615 determines if it is enabled to perform DoS attack mitigation (block 1610). If the limiter 615 is not enabled to perform DoS attack mitigation (block 1610), the border element 140, 141, 150, 152 implementing the attack mitigator 155 forwards the communication session request message to the IMS core 115 (block 1615). In some examples, the border element 140, 141, 150, 152 adds a border element identifier to the SIP INVITE message before forwarding the same to the IMS core 115. Control then exits from the example machine accessible instructions of FIG. 16.

If the limiter 615 is enabled to perform DoS attack mitigation (block 1610), the limiter 615 updates the current call initiation statistics for the calling and/or called IMS endpoints associated with the request (block 1620). The limiter 615 determines whether the updated statistics or any parameters associated with the SIP INVITE message are such that any mitigation rules and/or filters have been triggered (block 1625). If no mitigation rules and/or filters have been triggered (block 1625), control proceeds to block 1615 to forward the SIP INVITE message to the IMS core 115.

Returning to block 1625, if one or more mitigation rules and/or filters have been triggered (block 1625), the border element 140, 141, 150, 152 responds to the calling IMS endpoint with a SIP 5XX message to reject the requested communication session (block 1630). Control then exits from the example machine accessible instructions of FIG. 16.

Returning to block 1605, if a SIP NOTIFY message containing DoS mitigation information was received (block 1635), the example DoS information authenticator 605 of FIG. 6 determines whether the DoS mitigation information is authentic (block 1640). If the DoS mitigation information is authentic (block 1640), the DoS information authenticator 605 stores the one or more mitigation parameters, data, rules and/or filters received in the DoS header in the example DoS database 610 (block 1645). Control then exits from the example machine accessible instructions of FIG. 16. If the DoS mitigation information cannot be authenticated (block 1640), control exits from the example machine accessible instructions of FIG. 16 without updating the DoS database 610.

Returning to block 1635, if neither a SIP INVITE or SIP NOTIFY message containing DoS mitigation information was received (block 1635), the example border element 140, 141, 150, 152 processes the received message in accordance with any past, present and/or future SIP protocol standard and/or specification (block 1650). Control then exits from the example machine accessible instructions of FIG. 16.

Figure 17:
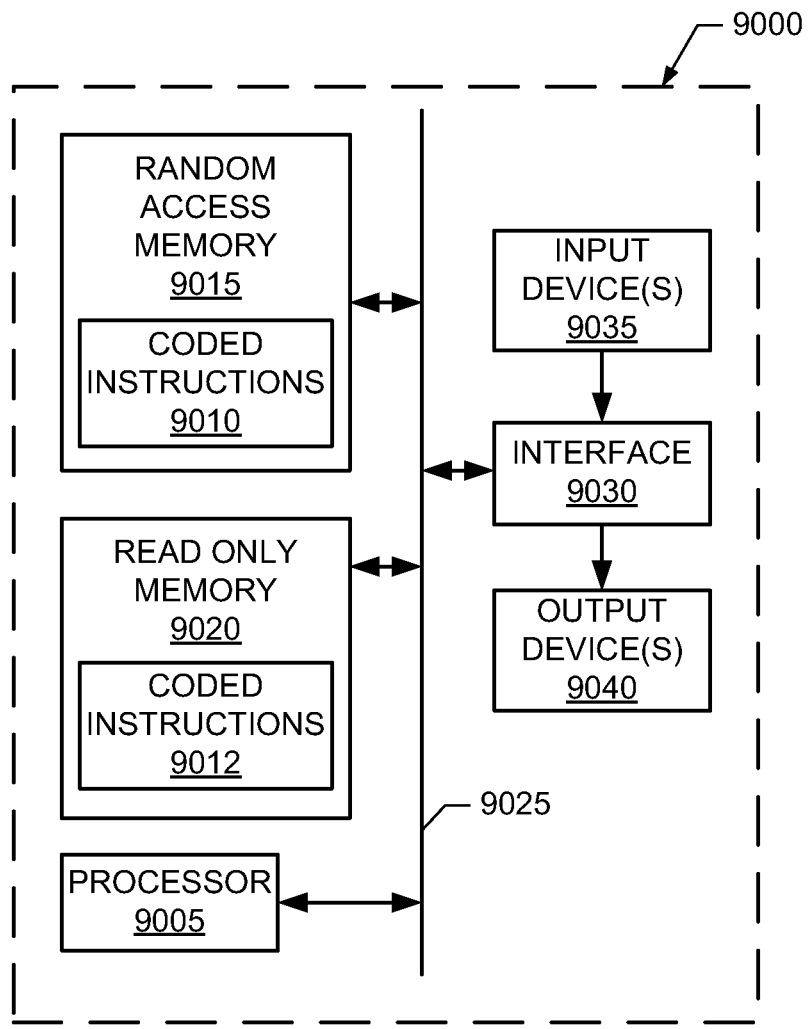
FIG. 17 is a schematic illustration of an example processor platform that may be used and/or programmed to carry out the example machine accessible instructions of FIGS. 8, 9, 10, 14, 15 and/or 16 to implement any of all of the example methods and apparatus described herein.

FIG. 17 is a schematic diagram of an example processor platform 9000 that may be used and/or programmed to implement all or a portion of any or all of the example S-CSCF servers 120, the DoS attack detectors 155, the example access border elements 140, 141, 150 and 152, and/or the example attack mitigators 155 of FIGS. 1, 3, 4 and/or 5. For example, the processor platform 9000 can be implemented by one or more general-purpose processors, processor cores, microcontrollers, etc.

The processor platform 9000 of the example of FIG. 17 includes at least one general purpose programmable processor 9005. The processor 9005 executes coded instructions 9010 and/or 9012 present in main memory of the processor 9005 (e.g., within a RAM 9015 and/or a ROM 9020). The processor 9005 may be any type of processing unit, such as a processor core, a processor and/or a microcontroller. The processor 9005 may execute, among other things, the example protocol message exchanges and/or the example machine accessible instructions of FIGS. 8, 9, 10, 14, 15 and/or 16 to implement the example methods and apparatus described herein.

The processor 9005 is in communication with the main memory (including a ROM 9020 and/or the RAM 9015) via a bus 9025. The RAM 9015 may be implemented by DRAM, SDRAM, and/or any other type of RAM device, and ROM may be implemented by flash memory and/or any other desired type of memory device. Access to the memory 9015 and the memory 9020 may be controlled by a memory controller (not shown). One or both of the example memories 9015 and 9020 may be used to implement either or both of the example DoS databases 515 and 610 of FIGS. 5 and 6.

The processor platform 9000 also includes an interface circuit 9030. The interface circuit 9030 may be implemented by any type of interface standard, such as an external memory interface, serial port, general-purpose input/output, etc. One or more input devices 9035 and one or more output devices 9040 are connected to the interface circuit 9030. The input devices 9035 and/or output devices 9040 may be used to, for example, implement the example network interfaces 405 and 505 of FIGS. 4 and 5.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   accessing a denial-of-service attack mitigation rule received via a session initiation protocol NOTIFY message, the denial-of-service attack mitigation rule based on call initiation rate statistics;
   analyzing a communication session request message based on the denial-of-service attack mitigation rule by comparing a first parameter of the communication session request message to a second parameter of the denial-of-service attack mitigation rule;
   rejecting the communication session request message by sending a session initiation protocol 5XX message to a calling device associated with the communication session request message when the first and second parameters match; and
   allowing the communication session request message by forwarding the communication session request message to an Internet protocol multimedia subsystem core when the first and second parameters do not match.

2. A method as defined in claim 1, further comprising receiving a session initiation protocol SUBSCRIBE message from the attack mitigator.

3. A method as defined in claim 1, further comprising:
   receiving a communication session request message from a calling endpoint; and
   updating the call initiation rates statistics based on the communication session request message.

4. A method as defined in claim 1, wherein the session initiation protocol NOTIFY message comprises extensible markup language text that represents the denial-of-service attack mitigation rule.

5. A method as defined in claim 1, wherein the first parameter of the session initiation protocol request comprises a phone number and the second parameter of the denial of service attack mitigation rule comprises the phone number.

6. A method as defined in claim 1, further comprising computing a cryptographic hash for an authentication header of the session initiation protocol NOTIFY message, the hash computed based on the denial-of-service attack mitigation rule.

7. An apparatus comprising:
   a memory comprising machine readable instructions; and
   a processor to execute the instructions to analyze a communication session request message based on the denial-of-service attack mitigation rule by:
   accessing the denial-of-service attack mitigation rule via a session initiation protocol NOTIFY message, the denial-of-service attack mitigation rule based on call initiation rate statistics;
   comparing a first parameter of the communication session request message to a second parameter of the denial-of-service attack mitigation rule;
   rejecting the communication session request message by sending a session initiation protocol 5XX message to a calling device associated with the communication session request message when the first and second parameters match; and
   allowing the communication session request message by forwarding the communication session request message to an Internet protocol multimedia subsystem core when the first and second parameters do not match.

8. An apparatus as defined in claim 7, further comprising a network interface to receive a session initiation protocol SUBSCRIBE message from an attack mitigator, wherein the session initiation protocol SUBSCRIBE message enables a notifier to send the session initiation protocol NOTIFY message to the attack mitigator.

9. An apparatus as defined in claim 7, further comprising a call statistics collector to update call initiation statistics associated with respective ones of communication endpoints in a denial-of-service database in response to received communication session request information, wherein a call statistics analyzer is to determine a value representative of a likelihood that a denial-of-service attack is occurring using the denial-of-service database.

10. An apparatus as defined in claim 9, wherein the communication session request information is received in a session initiation protocol INVITE message.

11. An apparatus as defined in claim 7, wherein the session initiation protocol NOTIFY message comprises extensible markup language text that represents the denial-of-service attack mitigation rule.

12. An apparatus as defined in claim 11, wherein the session initiation protocol NOTIFY message further comprises an authentication header containing a cryptographic hash computed based on the denial-of-service attack mitigation rule.

13. An apparatus as defined in claim 7, wherein the instructions cause the processor to determine a value representative of a likelihood that a denial-of-service attack is occurring by:
computing a sum of a first call initiation rate associated with a first endpoint and a second call initiation rate associated with a second endpoint, and
comparing the sum to a threshold.

14. An apparatus as defined in claim 7, wherein the first parameter of the session initiation protocol request comprises a phone number and the second parameter of the denial-of-service attack mitigation rule comprises the phone number.

15. A tangible machine readable storage device comprising instructions which, when executed, cause a machine to perform operations comprising:
accessing a denial-of-service attack mitigation rule received via a session initiation protocol NOTIFY message, the denial-of-service attack mitigation rule based on call initiation rate statistics;
analyzing a communication session request message based on the denial-of-service attack mitigation rule by comparing a first parameter of the communication session request message to a second parameter of the denial-of-service attack mitigation rule;
rejecting the communication session request message by sending a session initiation protocol 5XX message to a calling device associated with the communication session request message when the first and second parameters match; and
allowing the communication session request message by forwarding the communication session request message to an Internet protocol multimedia subsystem core when the first and second parameters do not match.

16. A machine readable storage device as defined in claim 15, wherein the operations further comprise receiving a session initiation protocol SUBSCRIBE message from an attack mitigator.

17. A machine readable storage device as defined in claim 15, wherein the operations further comprise:
receiving a communication session request message from a calling endpoint; and
updating the call initiation rates statistics based on the communication session request message.

18. A machine readable storage device as defined in claim 15, wherein the operations further comprise identifying the first parameter of the session initiation protocol request as a phone number and identifying the second parameter of the denial of service attack mitigation rule as the phone number.

19. A machine readable storage device as defined in claim 15, wherein the operations further comprise computing a cryptographic hash for an authentication header of the session initiation protocol NOTIFY message, the hash computed based on the denial-of-service attack mitigation rule.

20. A machine readable storage device as defined in claim 15, wherein the operations further comprise applying extensible markup language text in the session initiation protocol NOTIFY message that represents the denial-of-service attack mitigation rule.

* * * * *